US010650404B2

(12) United States Patent
Riordan et al.

(10) Patent No.: US 10,650,404 B2
(45) Date of Patent: May 12, 2020

(54) REAL-TIME BIDDING THROUGH PLACEBO-BASED EXPERIMENTATION

(71) Applicant: Adobe Inc., San Jose, CA (US)

(72) Inventors: Thomas Riordan, Chicago, IL (US); Narayan Kinhal, Dublin, CA (US); John Hughes, Lafayette, CA (US); Jason Lopatecki, Emeryville, CA (US); Darren Sue, El Cerrito, CA (US); Christopher Bell, Piedmont, CA (US); Matthew Ellinwood, Oakland, CA (US)

(73) Assignee: ADOBE INC., San Jose, CA (US)

( * ) Notice: Subject to any disclaimer, the term of this patent is extended or adjusted under 35 U.S.C. 154(b) by 178 days.

(21) Appl. No.: 15/697,346

(22) Filed: Sep. 6, 2017

(65) Prior Publication Data

US 2017/0372352 A1    Dec. 28, 2017

Related U.S. Application Data

(63) Continuation-in-part of application No. 14/946,525, filed on Nov. 19, 2015, now Pat. No. 10,163,125.
(Continued)

(51) Int. Cl.
G06Q 30/02 (2012.01)

(52) U.S. Cl.
CPC ..... *G06Q 30/0244* (2013.01); *G06Q 30/0246* (2013.01); *G06Q 30/0275* (2013.01); *G06Q 30/0277* (2013.01); *G06Q 30/0249* (2013.01)

(58) Field of Classification Search
None
See application file for complete search history.

(56) References Cited

U.S. PATENT DOCUMENTS

| 7,010,497 B1 | 3/2006 | Nyhan et al. |
| 2005/0221397 A1 | 1/2005 | Cui et al. |

(Continued)

FOREIGN PATENT DOCUMENTS

WO    WO 2010-138512    12/2010

OTHER PUBLICATIONS

"Measuring the Effects of Advertising: The Digital Frontier" (Published on Aug. 31, 2013—NBER Working Papers 19520, National Bureau of Economic Research, Inc.) (Year: 2013).*

(Continued)

*Primary Examiner* — James M Detweiler
(74) *Attorney, Agent, or Firm* — Keller Jolley Preece

(57) ABSTRACT

Systems and methods for operating placebo-based experiments are described for online advertisements. One or more embodiments of the disclosed systems and methods utilizes an ad swapping approach to offer placebo media exposures, at no additional cost to an advertiser. One or more embodiments further provide a native experimentation platform that allows users to run tests of ad placements to measure the effectiveness of ads and view results displayed on a user interface. The disclosed systems and methods can assign viewers into a test group if shown the test ad or a control group if shown a control ad. The control ad can be provided at no cost to the advertiser for embodiments where the placebo ad belongs to an alternative advertiser. Effectiveness of third party attribution can also be evaluated. The disclosed systems and methods can define experiment parameters, including control frequency, test viewer groups, and control viewer groups.

20 Claims, 13 Drawing Sheets

Related U.S. Application Data

(60) Provisional application No. 62/216,907, filed on Sep. 10, 2015, provisional application No. 62/468,212, filed on Mar. 7, 2017.

(56) References Cited

U.S. PATENT DOCUMENTS

| | | | |
|---|---|---|---|
| 2010/0306043 A1 | 12/2010 | Lindsay et al. | |
| 2011/0161161 A1* | 6/2011 | Juda | G06Q 30/02 705/14.42 |
| 2013/0151332 A1* | 6/2013 | Yan | G06Q 30/0243 705/14.42 |
| 2013/0297405 A1* | 11/2013 | Farahat | G06Q 30/02 705/14.43 |
| 2014/0278921 A1 | 9/2014 | Sankaran et al. | |
| 2016/0019582 A1* | 1/2016 | Bindra | G06Q 30/0244 705/14.43 |
| 2016/0055320 A1* | 2/2016 | Wang | G16H 50/70 705/2 |
| 2016/0275569 A1* | 9/2016 | Zheng | G06Q 30/0277 |
| 2017/0076320 A1 | 3/2017 | Hughes et al. | |
| 2017/0372354 A1* | 12/2017 | Yildiz | G06Q 30/0246 |
| 2019/0080350 A1 | 3/2019 | Hughes et al. | |

OTHER PUBLICATIONS

"Understanding Digital Advertising Attribution", 2012, https://www.cognizant.conn/InsightsWhitepapers/Understanding-Digital-Advertising-Attribution.pdf.

U.S. Appl. No. 14/946,525, Aug. 27, 2018, Notice of Allowance.

U.S. Appl. No. 14/946,525, Feb. 2, 2018, Office Action.

Glazer, Jeffrey M., "Is a Blank Ad Better Than a Standard Ad", Madison Beer Review, located at http://www.madisonbeerreview.com/2010/04/is-blank-ad-betterthan-standard-ad.html, (Apr. 23, 2010), 3 pp. total.

Quadlin, Sean, "What to Make of View-through Conversions", PPC Hero, located at http://www.ppchero.com/what-to-make-of-view-through-conversions/, (Aug. 5, 2013), 6 pp. total.

Team Position2, "View-through Conversions", located at http://blogs.position2.com/view-conversions, (Jan. 30, 2015), 7 pp. Total.

* cited by examiner

| | MainGroup | PlaceboGroup | ExperimentGroup |
| --- | --- | --- | --- |
| | ↑ 930 | ↑ 920 | ↑ 910 |
| impression/view/.... (no placebo information) | paID | N/A | N/A |
| impression/view/.... (with placebo information) | paID | paID | expaID |
| basic conversion (engagement with conversion advertiser, no placebo engagement) | paID of the enagement | N/A | N/A |
| perfect experiment conversion (only placebo engagements) | N/A | (optional: paID of the placebo engagement) | expaID of the placebo engagement |
| leaky experiment conversion (both placebo engagements and engagement with conversion advertiser) | paID of the engagement with the conversion advertiser | (optional: paID of the placebo engagement) | expaID of the placebo engagement |

*FIG. 9*

REAL-TIME BIDDING THROUGH PLACEBO-BASED EXPERIMENTATION

CROSS-REFERENCE TO RELATED APPLICATIONS

This application is a continuation-in-part of U.S. patent application Ser. No. 14/946,525 filed Nov. 19, 2015, which claims the benefit of U.S. Provisional Patent Application No. 62/216,907, filed Sep. 10, 2015. This application also claims the benefit of and priority to U.S. Provisional Patent Application No. 62/468,212 filed Mar. 7, 2017. The entire contents of the foregoing patent applications are hereby incorporated by reference.

BACKGROUND

Recent years have seen rapid development in real-time provision of digital content to users visiting various media properties (e.g., websites or apps hosted on remote servers). Indeed, due to the increased prevalence of computing devices such as smartphones, tablets, laptops, or personal computers, individuals and businesses increasingly access a variety of websites seeking digital content, such as news articles, social media posts, games, or digital videos. In response to this increase in user access to media properties, demand has also increased for the opportunity to place digital content on media properties for consumption by individual visitors. For example, when a user visits a website, some systems utilize concurrent advertising systems to place advertising opportunities for sale to third-parties.

Although third-party digital content providers can utilize such concurrent advertising systems to provide digital content to users visiting media properties, these conventional systems have several shortcomings. For example, due to the near-instantaneous nature of concurrent advertising systems, third-party digital content providers have difficulty developing effective and efficient online ad campaigns and judging the efficacy of such online ad campaigns. To illustrate, an advertiser can utilize conventional systems to select an advertisement for an online ad campaign and purchase impression opportunities, but the advertiser remains unaware of the amount of improvement attributable to the online ad campaign. Moreover, the advertiser has difficulty knowing what changes can be made to improve the online ad campaign. These concerns are exacerbated by the nature of concurrent advertising systems, where impression opportunities are purchased for individual users simultaneously accessing websites and where purchasing decisions must be made digitally, within milliseconds, to provide the advertisements to the website visitor (e.g., as the website loads on the visitor's computing device).

Some conventional systems seek to address these problems by performing costly experiments for advertisers. For example, some conventional systems purchase a plurality of ad slots, provide standardized content in the ad slots, and perform an experiment utilizing the standardized content as a baseline. Although this approach can provide an indication of the improvement provided by other advertisements, such experiments are very expensive. Indeed, to perform such an experiment, an advertiser needs to purchase large numbers additional impression opportunities for the standardized content.

Moreover, these experimentation approaches also introduce inefficiencies in conventional concurrent advertising systems. Indeed, as a result of purchasing content for both test advertisements and standardized advertisements, conventional concurrent advertising systems are required to manage unnecessary purchases and provide unnecessary content to users via websites. Accordingly, in addition to imposing costs on advertisers, conventional experimentation systems unnecessarily increase processing and storage demand on systems.

These and other problems exist with regard to conventional advertising experimentation and design systems.

BRIEF SUMMARY

One or more embodiments of the present disclosure provide benefits and/or solve one or more of the foregoing or other problems in the art with systems and methods that improve online ad campaigns utilizing a placebo-based experiment that utilizes both test advertisements of the first advertiser and advertisements of a second advertiser to determine media lift. Specifically, the disclosed systems and methods identify users belonging to a control group and viewers belonging to a test group. The disclosed systems and methods provide a test advertisement associated with a first advertiser to viewers that belong to the test group and provide advertisements associated with one or more alternative advertisers to viewers that belong to the control group. By comparing performance of the test advertisement associated with the first advertiser to performance of the advertisements associated with the one or more alternative advertisers, the disclosed systems and methods can determine a measure of media lift for the advertisement associated with the first user. Moreover, based on the comparison, the disclosed systems and methods can suggest or implement modifications to an online ad campaign.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

FIG. 9 shows an example database of parameters for summarizing an experiment in accordance with one or more embodiments.

DETAILED DESCRIPTION

Figure 1:
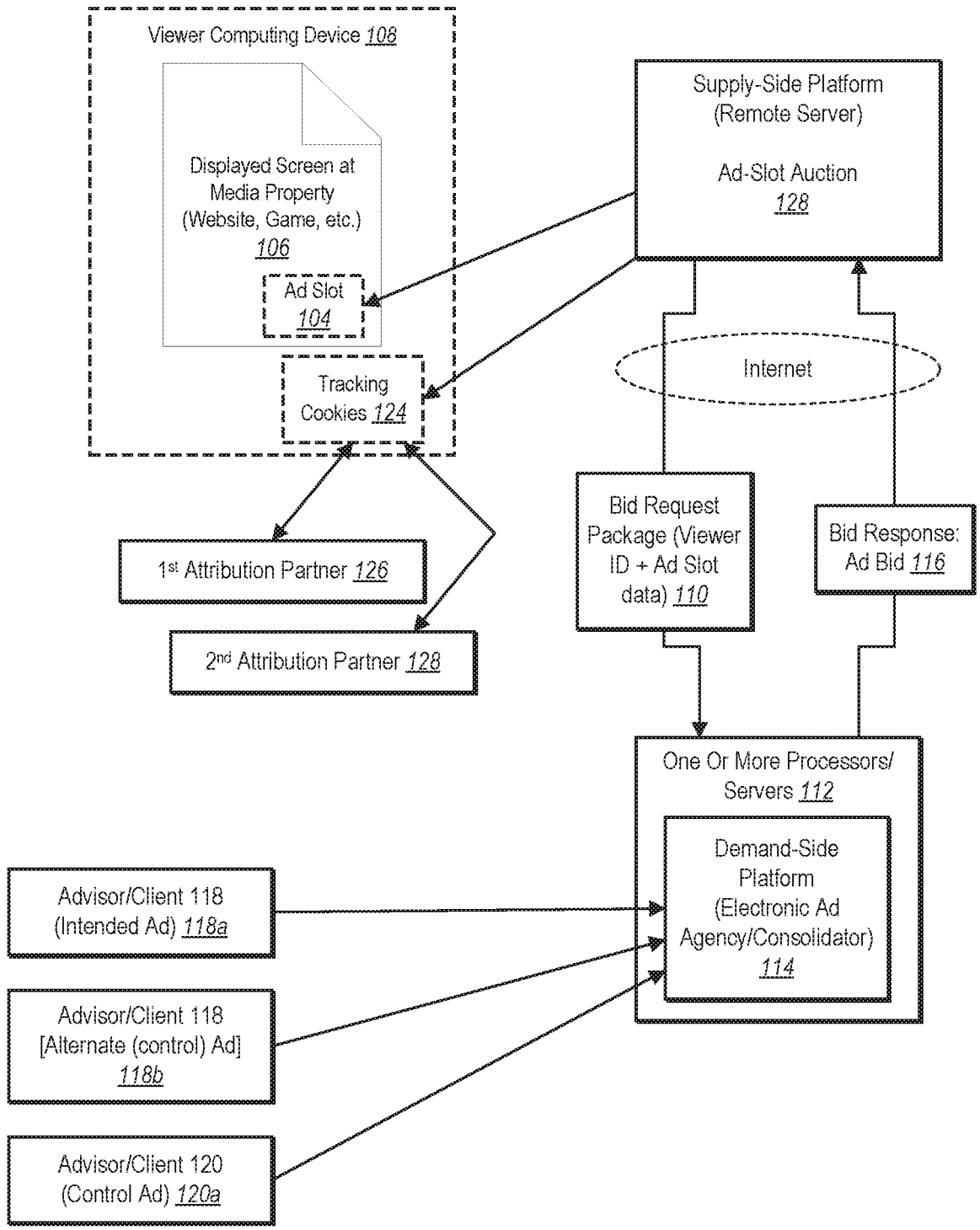
FIG. 1 shows an overview block diagram showing system components and data flow according to one or more embodiments of a real-time experimentation system.

One or more embodiments of the present disclosure include a real-time experimentation system that utilizes an ad swapping approach to offer placebo media exposures and conduct a media lift experiment. For example, in one or more embodiments the real-time experimentation system swaps an advertisement of a first advertiser for advertisements of alternative advertisers in a real-time bidding environment for purchasing impression opportunities. In particular, the real-time experimentation system determines viewers that belong to a control group and viewers that belong to a test group. The real-time experimentation system provides advertisements of alternative advertisers to viewers that belong to the control group and a test advertisement of a first advertiser to viewers that belong to the test group. The real-time experimentation system tracks performance of the advertisements of alternative advertisers (i.e., placebo ads) together with performance of the test advertisement for the first advertiser and determines a measure of the effectiveness of the test advertisement (i.e., a measure of media lift).

To illustrate, in one or more embodiments the real-time experimentation system identifies a first set of campaign parameters of a first advertiser and a second set of campaign parameters of a second advertiser. The real-time experimentation system then runs a media lift experiment for the first advertiser. Specifically, the real-time experimentation system receives a bid request package for an impression opportunity associated with a first viewer visiting a website. The real-time experimentation system determines that the first viewer corresponds to a control group. Based on a determination that the first viewer satisfies the first set of campaign parameters and the second set of campaign parameters and the determination that the first viewer corresponds to the control group, the real-time experimentation system can automatically respond to the bid request package by providing a control ad associated with the second advertiser for display to the first viewer via the website. Moreover, the real-time experimentation system determines a measure of media lift for a test ad associated with the first advertiser based on performance of the control ad associated with the second advertiser.

In one or more embodiments, the real-time experimentation system is implemented in a real-time bidding environment where an electronic advertising agency (e.g., an advertising consolidator) operating a demand-side platform receives billions of daily auction opportunities for electronic media impressions. Specifically, the demand-side platform can receive billions of impression opportunities from supply-side partners such as Google®, Yahoo®, etc. These partners operate auctions for ad impressions (e.g., ad impressions for viewers simultaneously visiting websites associated with the supply-side partners) and then place electronic ads based on auction results. Each impression (ad slot) opportunity includes information parameters about the ad impression. The demand-side platform then analyzes hundreds of advertisements in their system, supplied by advertiser/clients along with desired filtering/targeting parameters, against information parameters supplied by the supply-side partner.

Based on this analysis, the demand-side platform can filter out any ads that do not qualify (e.g., impression opportunities that do not satisfy targeting parameters). For example, an ad may not be appropriate to submit if the advertiser does not want the ad to target a particular media property (website), age group, gender, etc. For ads that are not removed due to a mismatch with targeting parameters, the demand-side platform then evaluates the corresponding bids that represent how much each advertiser/client is willing to pay. The winning bid in the internal auction is then sent to the external auction at the supply-side partner to compete for the impression opportunity.

The real-time experimentation system solves a number of technical problems unique to this particular technological environment. For example, the decision to bid on impression opportunities must be made digitally (and within milliseconds) of a viewer visiting a target media property. Moreover, the decision to bid on an impression opportunity is made individually based on the unique characteristics of each viewer. As mentioned previously, these factors make media lift experimentation difficult to implement. For example, the real-time bidding environment makes it technically difficult to maintain the integrity of control and/or experimental groups. Similarly, given the speed and nature of the real-time bidding environment it is impossible for human actors to select and provide digital advertisements in operating a media lift experiment. Furthermore, the speed and individualistic nature of the real-time bidding environment increases the technical difficulty of selecting appropriate advertisements for individual viewers, particularly when considering bids, advertisements, and desires of multiple different advertisers.

As mentioned above, the real-time experimentation system addresses these issues by operating a media lift experiment that swaps advertisements of a first advertiser with advertisements of alternative advertisers. Specifically, the real-time experimentation system can determine viewers that correspond to a control group and viewers that belong to a test group. The real-time experimentation system then provides different advertisements to the control group and the test group within milliseconds and tracks performance of the different advertisements with regard to each viewer.

To illustrate, the real-time experimentation system can assign viewers to a control group or a test group by utilizing a randomizing function and a control frequency threshold. In particular, the real-time experimentation system can receive a bid request package that includes a viewer id of a new viewer (i.e., a viewer that has not previously been assigned to a group). The real-time experimentation system can apply a randomizing function (e.g., a hash function) subject to the control frequency threshold to assign the new viewer to a control group or a test group.

The real-time experimentation system can also identify viewers that have already been assigned to a control group or a test group. For example, the real-time experimentation system can identify a viewer id corresponding to a viewer from a bid request package and utilize the viewer id to determine that the viewer is associated with a control group or a test group. In this manner, the real-time experimentation system can manage control groups and test groups to constrain the advertisements provided to individual viewers from each of the groups.

Upon determining whether a viewer belongs to a control group or a test group, the real-time experimentation system can also select an advertisement for the viewer. For instance, upon determining that a viewer belongs to a test group, the real-time experimentation system can select a test advertisement from a first advertiser. Moreover, upon determining that a viewer belongs to a control group, the real-time experimentation system can identify a control advertisement from an alternative advertiser.

In one or more embodiments, the real-time experimentation system only selects advertisements that satisfy advertiser campaign parameters. Indeed, in one or more embodiments, the real-time experimentation system allows advertisers to provide campaign parameters for online ad campaigns and/or media lift experiments. The real-time experimentation system can select advertisements that satisfy advertiser targeting parameters (i.e., a mutually desirable auction) so that advertisements shown to the viewer are likely relevant to the interests of the particular viewer. Utilizing this approach, the real-time experimentation system can provide control ads that are likely to be relevant to a viewer, thus providing a better control in determining measures of media lift for a test advertisement of a first advertiser.

The real-time experimentation system can also track performance of control advertisements and/or test advertisements. For example, in one or more embodiments, the real-time experimentation system drops a tracking cookie to the computing device of the viewer and monitors user interactions with advertisements (e.g., conversion events). Similarly, in one or more embodiments, the real-time experimentation system fires a tracking pixel to track user interactions with advertisements. A tracking pixel is code inserted into a custom or third-party creative that makes a server call and returns a transparent 1×1 image (normally a GIF file).

Furthermore, in one or more embodiments, the real-time experimentation system utilizes Server Side conversion tracking, which can be more advantageous for tracking activity on mobile devices (or browsers/devices that do not allow for cookies). Server-Side Tracking (also called Server Postback Tracking or just Postback Tracking), is a method of tracking conversions that uses the advertiser's server rather than the viewer's browser. For example, the real-time experimentation system can utilize generate a transaction ID corresponding to user interaction with a server and track user interactions based on the transaction ID. The real-time experimentation system can utilize server-side tracking in isolation or in combination with cookie/pixel based tracking. Because many browsers block cookies (and many mobile devices do not support cookies), the real-time experimentation system can utilize tracking pixels and server-side tracking based on transaction IDs (i.e., session IDs) to track conversions from test ads and control ads with greater success than conventional tracking methods.

The real-time experimentation system can then compare performance of test advertisements of a first advertiser and placebo advertisements of alternative advertisers. For example, the real-time experimentation system can generate a variety of measures of media lift to determine the effectiveness of the test advertisement of a first advertiser. Moreover, the real-time experimentation system can provide these measures of media lift via a user interface of a client device.

Furthermore, in one or more embodiments, the real-time experimentation system can suggest (or implement) modifications to an online ad campaign based on a media lift experiment. For example, the real-time experimentation system can suggest (or implement) changes in targeting parameters for an online ad campaign based on the results of a media lift experiment to improve performance of the online ad campaign.

The real-time experimentation system provides a number advantages over conventional systems. Indeed, by utilizing placebo ads from alternative advertisers in performing a media lift experiment for a first advertiser, the real-time experimentation system can determine effectiveness of an online ad campaign in a real-time bidding environment and identify parameters to improve the effectiveness of the online ad campaign. For example, the real-time experimentation system can provide a user interface dashboard that includes measures of media lift, in real-time, during operation of an online ad campaign. Such real-time feedback allows for speedy or immediate implementation of changes so costs and resources are not wasted on purchasing ad slots for ineffective ads.

Furthermore, the real-time experimentation system can suggest (or automatically implement) modifications to campaign parameters to improve the performance of an online ad campaign in a real-time bidding environment. In addition, the real-time experimentation system can allow a user to control various features of the media lift experiment including advertisements, a control frequency threshold for control groups and test groups, campaign parameters, or attribution methodology. Indeed, based on the results of the real-time experimentation, the real-time experimentation system can modify a campaign in real time, thereby increasing effectiveness and reducing wasted resources.

The real-time experimentation system can also provide these benefits without imposing extra costs to purchase placebo ads. Indeed, in one or more embodiments, the real-time experimentation system replaces advertisements of a first advertiser with advertisements of alternative advertisers. Because the alternative advertisers purchase impression opportunities for their own advertisements, the first advertiser need not purchase these impression opportunities for placebo ads in performing the media lift experiment.

Furthermore, the real-time experimentation system can reduce the processing and storage requirements for computers, servers, or other devices implementing the real-time experimentation system. Indeed, by reducing the need to purchase and provide unnecessary standardized content, the real-time experimentation system can reduce the number of unnecessary bids, the number of unnecessary purchases, and the number of unnecessary standardized content placements. Furthermore, in one or more embodiments, the real-time experimentation system can utilize a single viewer as part of a test group and as part of a control group for different experiments. Thus, the real-time experimentation system can run multiple media lift experiments simultaneously with viewers contributing to multiple experiments simultaneously. Accordingly, the real-time experimentation system improves computing devices by reducing unnecessary processing and storage associated with purchasing and providing unnecessary content.

Additional advantages and benefits of the real-time experimentation system will become apparent in view of the description included hereinafter. In particular, one or more embodiments of the real-time experimentation system will be described below with reference to one or more figures. In addition, the following definitions of terms will be used to describe one or more features of the real-time experimentation system.

As used herein, the term "test ad" (or exposed ad) refers to an advertisement that is the subject of a media lift experiment. In particular, the term "test ad" includes a digital advertisement that a client seeks to analyze to determine the effectiveness of the digital advertisement. For example, the term "test ad" includes an advertisement that is part of an online ad campaign that is the subject of an experiment to determine media lift.

As used herein, the term "control ad" (or placebo ad) refers to an advertisement that is utilized as a reference point for a media lift experiment. In particular, the term "control ad" includes an advertisement that is utilized to calculate media lift with regard to a test ad. For example, a "control ad" includes an advertisement of an alternative advertiser that is utilized as a reference to calculate media lift of a test ad of a first advertiser.

As used herein, the term "test group" (or exposed group or exposed segment) refers to a group of viewers that are shown a test ad. In particular, the "test group" refers to a group of viewers selected to receive a test ad and that are utilized to measure media lift of the test ad. For example, a test group includes a group of viewers that the real-time experimentation system selects to receive a test ad (e.g., viewers for which the real-time experimentation system submits a bid to show the test ad within a real-time bidding environment) when the group of viewers visits a web site.

As used herein, the term "control group" (or control segment) refers to a group of viewers not selected to receive the test ad. In particular, the term "control group" includes a group of viewers selected to receive a control ad rather than a test ad. For example, a control group includes a group of viewers that the real-time experimentation system selects to receive a control ad when the group of viewers visits a website As used herein, the term "media lift" (or "measure of media lift") refers to a measure of the effectiveness of a test ad. For example, the term media lift includes a measure of the effectiveness of a test ad relative to one or more control ads. To illustrate, media lift includes a measure of how much a test ad influences a conversion event. For example, media lift can be calculated as a change in awareness or favorability towards a product due to a test ad. A measure of media lift can include conversions (or a change in conversions) attributable to a test ad. To illustrate, a measure of media lift can include clicks (or a change in clicks), purchases (or a change in purchases), registrations (or a change in registrations), views (or a change in views), favorability score (or a change in favorability score), product awareness score (or a change in a product awareness score) due to a test ad, etc.

As used herein, a "media lift experiment" (or simply "experiment") refers to a test designed to measure media lift of an advertisement. In particular, the term "media lift experiment" includes a test designed to measure media lift of an advertisement within a real-time bidding environment. For example, a media lift experiment includes a test that compares the performance of a test ad with the performance of a control ad to determine a measure of media lift. Specifically, a media lift experiment includes a test that compares performance of a test ad of a first advertiser within a real-time bidding environment with the performance of control ads from alternative advertisers within the real-time bidding environment.

As used herein, the term "campaign parameters" refers to adjustable parameters utilized to run an online ad campaign and/or conduct a media lift experiment. In particular, the term "campaign parameters" refers to adjustable parameters utilizes to run an online ad campaign and/or conduct a media lift experiment within a real-time bidding environment. For example, campaign parameters can include one or more advertisements, one or more budgets, or targeting parameters.

As utilized herein, the term "targeting parameters" refers to adjustable parameters utilized to select an advertisement to provide to a viewer. In particular, the term "targeting parameters" includes parameters utilized to determine a response to a bid request for an impression opportunity in a real-time bidding environment. To illustrate, targeting parameters can include one or more targeting media properties (e.g., particular websites, apps, or venues for placing an advertisement), targeting demographics (e.g., age or sex of a target viewer), target locations (e.g., country, city, or state of a target viewer), target devices (e.g., a brand or type of computing device for a target viewer), or target software (e.g., a type of browser or application utilized by a target viewer).

As used herein, the term "impression opportunity," refers to an available opportunity for providing digital content to a viewer. In particular, the term "impression opportunity" refers to an advertising space in a media property available for purchase. For example, impression opportunity includes an advertising space (e.g., ad slot) on a website that can be purchased and utilized to provide digital content to a viewer of the website.

As used herein, the term "bid request package" refers to a digital request for bids for an impression opportunity. In particular, the term bid request package includes a digital request from a supply-side platform for bids for an impression opportunity provided by the supply-side platform. A bid request package can include various information regarding the impression opportunity, such as a viewer id of the viewer corresponding to the impression opportunity or the media property corresponding to the impression opportunity.

As used herein, the term "conversion" refers to a user interaction in relation to a product or services corresponding to an advertisement or campaign. For example, the term conversion refers to a user interaction corresponding to an advertisement that an advertiser seeks to encourage and/or track. For instance, a conversion can include purchases or sales, subscriptions, etc. Moreover, conversions can also include clicks; watching a complete video ad; registering; reading reviews; adding an item to a wish list; adding an item to a shopping cart; and engaging in a chat.

As mentioned above, one or more embodiments of the real-time experimentation system operates within a real-time bidding environment to bid on ad slot opportunities for advertiser/client 1's ad, but occasionally silently selects a second ad that is not even for the same advertiser/client, but is instead an ad from advertiser/client 2. For a certain percentage of advertiser/client 1's ads, the real-time experimentation system buys the ad spot, but at the places advertiser/client 2's ad instead. The real-time experimentation system bills advertiser/client 2 and their ad will run in reality, but drops advertiser 1's cookie on the viewer. The third-party attribution partner will think the substitute (control) ad was advertiser/client 1's and partially attribute conversions to the control ad, which was not advertiser/client 1's intended ad and is in reality advertiser/client 2's ad. Thus, the campaign runs in an "always on" fashion, and adds no incremental cost to either advertiser/client 1's campaign or advertiser/client 2's campaign.

As mentioned previously, the actual mechanism utilized to perform the process described above uses a pixel that is fired to signal the attribution partner that the ad is being viewed, and which ad it is—in this case that the ad is advertiser/client 1's ad (regardless of whose ad it really is). The attribution partner responds by placing/dropping their tracking cookie on the viewer's computer. Thus, the demand-side platform causes, indirectly, the tracking cookie to be dropped on the viewer. In the example just described above, the attribution partner will track results for both ads as if they both belonged to advertiser/client 1, even though some of the placements are actually advertiser/client 2's ad. The attribution partner tracks the cookies through future viewer interactions which may include one or more conversion events.

A variation on this process includes a demand-side platform performing their own cookie tracking and conversion event attribution. The process is similar to that described above except that there is no need to fire a pixel since the demand-side platform is already aware of the ad placement. For this alternate scenario, the demand-side platform drops the cookie on the viewer's computer rather than an attribution partner.

For example, FIG. 1 provides additional detail regarding a real-time bidding environment in accordance with one or more embodiments of the real-time experimentation system. As mentioned above, real-time bidding includes an automated, scaled process of buying and selling display ad impressions (e.g., digital images, digital video, digital text or other advertising formats). In the real-time bidding process, advertisers bid on an impression based on their interest in the web visitor (how relevant the visitor's demographics, online behavior, etc. are to the advertiser in relation to one or more targeting parameters). This real-time bidding eco-system can include demand-side platforms, supply-side platforms, and/or client devices. As mentioned, within this real-time bidding environment, the real-time experimentation system 100 identifies viewers, sends/receives bid requests and bid responses, and provides an advertisement to a viewer in less than 200 milliseconds from start to finish for each online ad placement.

For example, FIG. 1 shows an overview block diagram showing system components and data flow according to one or more embodiments of a real-time experimentation system 100. As shown, the real-time experimentation system 100 includes a supply-side platform 102, a demand-side platform 114, advertisers/clients 118, 120 (corresponding to ads 118a, 118b, and 120a), attribution partners 126, 128, and a viewer operating a viewer computing device 108. As shown in FIG. 1, the supply-side platform 102 and the demand-side platform 114 conduct an ad slot auction based on ads from the advertisers/clients 118, 120 for an ad slot 104 corresponding to the viewer computing device 108.

The viewer computing device 108, the supply-side platform 102, and the demand-side platform client 114 may comprise a variety of different computing devices. Furthermore, the advertisers/clients 118, 120 and the attribution partners 126, 128 may utilize a variety of computing device to communicate with other components of the real-time experimentation system 100. For instance, in one or more embodiments, the viewer computing device 108, the supply-side platform 102, the demand-side platform 114, and computing devices corresponding to the advertisers/clients 118, 120 and the attribution partners 126, 128 can comprise one or more computing devices such as those described below in relation to FIG. 13.

As illustrated in FIG. 1, the ad slot 104 corresponds to a viewer computing device 108 with a display screen. Specifically, the ad slot 104 can comprise a portion of a media property 106 that appears on the display screen of the viewer computing device 108. To illustrate, the ad slot 104 can include an advertisement slot within a website, a game, or an application running on the viewer computing device 108.

As shown in FIG. 1, the real-time experimentation system 100 can also include the supply-side platform 102. The supply-side platform 102 can comprise one or more computing devices (e.g., remote servers) that manage inventory of impression opportunities (e.g., from a plurality of media properties). In particular, the supply-side platform 102 can receive impression opportunities from a plurality of media properties, such as remote servers hosting websites, remote servers hosting games, or remote server hosting applications. The supply-side platform 102 can receive inventory from thousands of online publications. Moreover, the supply-side platform 102 can create an auction environment that allows impression opportunities to be sold to the highest bidder.

For example, as shown in FIG. 1, the supply-side platform 102 provides a bid request package 110 to a demand-side platform 114. Programming, at the demand-side platform 114, according to one or more embodiments, runs on one or more processors/servers 112 to respond to the bid request package within milliseconds. The bid request package 110 may include data on the available ad slot 104 such as a viewer ID. For example, the bid request package 110 may include information regarding the viewer (e.g., viewer id, demographic information, geographic location), the viewer computing device 108 (e.g., type of device such as mobile or personal computer, manufacturer of the device, operating system, or applications loaded), the impression opportunity (e.g., ad size), and/or the media property (e.g., type or name of media property).

As shown, the demand-side platform 114 receives the bid request package 110 and generates a bid response 116. The demand-side platform 114 comprises one or more computing devices (e.g., remote servers) that receive and respond to bid request packages on behalf of one or more advertisers/clients. For instance, as shown in FIG. 1, the demand-side platform 114 returns a bid response 116 to the supply-side platform 102 that includes a bid for the ad slot and the ad to be placed. For one or more embodiments, advertisements to be placed may include; an intended ad 118a from advertiser/client 118; an alternate (control) ad 118b from advertiser/client 118; a control ad 120a from advertiser/client 120; or a blank/unrelated ad.

The real-time experimentation system 100 can utilize the demand-side platform 114 to select one or more advertisements and respond to bid requests based on the one or more advertisements. For example, the demand-side platform 114 receives campaign parameters from the advertiser/client 118 and the advertiser/client 120. The demand-side platform 114 analyzes the bid request package and determine whether and/or how to respond to the bid request package for each of the advertisers. To illustrate, the demand-side platform 114 compares targeting parameters of the advertiser/client 118 with the bid request package and determines that the bid request package satisfies the targeting parameters of the advertiser/client 118. In response, the demand-side platform 114 generates and sends a bid response to the supply-side platform 102. Specifically, the demand-side platform 114 can generate a bid response to the supply-side platform 102 indicating a bid and an advertisement to provide to the viewer computing device 108.

The demand-side platform 114 sends one or more responses to a bid request package. In one or more embodiments, the demand-side platform determines a bid for each advertiser/client 118, 120 and/or advertisement 118a, 118b, 120a and only submits a single bid response. Specifically, the demand-side platform 114 can conduct an internal auction to determine which ads/bids are submitted to the external auction at the supply-side platform 102. In such embodiments, the demand-side platform can provide a bid response for the highest bid from the advertisers/clients 118, 120. In other embodiments, the demand-side platform prepares and provides a bid response for any advertisement that satisfies campaign parameters of a given advertiser/campaign.

The supply-side platform 102 receives and analyzes bid responses and determines a winning advertisement. For example, the supply-side platform 102 can identify the highest bid from a plurality of bid responses and select the advertisement corresponding to the highest bid. In some embodiments, the supply-side platform 102 considers not only the highest bid, but information regarding the advertiser and/or the advertisement (e.g., appropriates of the advertisement or advertiser for the media property).

When an ad slot auction is won, the demand-side platform 114 (and/or the supply-side platform 102) provides an ad (e.g., the ad 118a, 118b, or 120a) for display to the viewer computing device 108. Moreover, the demand-side platform 114 can track user interaction with the ad (e.g., track conversions resulting from the ad). The demand-side platform 114 can utilize the supply-side platform 102 and/or the attribution partners 126, 128 to track user interaction with the ad. For example, in one or more embodiments, the real-time experimentation system 100 will cause at least one tracking cookie to be dropped by a first attribution partner 126. In an alternate embodiment, tracking cookies may also be dropped by a second attribution partner 128.

In other embodiments, the real-time experimentation system 100 utilizes server-side tracking. For example, the real-time experimentation system 100 can detect user selection (e.g., a click) of an advertisement and assign a transaction ID to the viewer. The real-time experimentation system 100 can pass the transaction ID (e.g., to the advertiser or demand-side platform) as part of a URL when the viewer visits a website (e.g., a website of the advertiser). The real-time experimentation system 100 can then track further user interactions (e.g., purchases or selections) based on the transaction ID.

FIG. 1 illustrates that the supply-side platform 102 and the demand-side platform 114 can communicate via the Internet. In addition to the Internet, the components of the real-time experimentations system 100 can communicate via any suitable network over which computing devices can communicate. Example networks are discussed in more detail below with regard to FIG. 13.

As illustrated, in one or more embodiments, the supply-side platform 102 and/or the demand-side platform 114 can implement all, or a portion of, the real-time experimentation system 100. For instance, the real-time experimentation system 100 can comprise an application running on the demand-side platform 114 or a portion of a software application that can be downloaded from the demand-side platform 114 (or another server). For example, the real-time experimentation system 100 can include a web hosting application that allows the demand-side platform 114 to interact with the supply-side platform 102.

Although FIG. 1 illustrates a particular arrangement of the viewer computing devices 108, the supply-side platform 102, the demand-side platform 114, attribution partners 126, 128 (and corresponding devices), or advertisers/clients 118, 120 (and corresponding devices), various additional arrangements are possible. For example, while FIG. 1 illustrates a single viewer computing device 108, the real-time experimentation system 100 can communicate with multiple viewer computing devices. Moreover, although FIG. 1 illustrates a separate supply-side platform 102 and demand-side platform 114, the real-time experimentation system 100 can be implemented with a single platform for running an ad slot auction. Similarly, in some scenarios, an electronic advertising agency operating a demand-side platform and an advertiser may in fact be the same entity. For instance, a large organization with an internal advertising department may be capable of acting as a demand-side platform. Also, in some instances, there may be no internal auction, and only a submission to an external auction is performed.

Similarly, although the real-time experimentation system 100 of FIG. 1 is depicted as having various components, the real-time experimentation system 100 may have additional or alternative components. For example, the real-time experimentation system 100 can be implemented on a single computing device. In particular, the real-time experimentation system 100 may be implemented in whole by the demand-side platform 114 or the real-time experimentation system 100 may be implemented in whole by the supply-side platform 102. Alternatively, the real-time experimentation system 100 may be implemented across multiple devices or components (e.g., utilizing the viewer computing device 108, the supply-side platform 102, the demand-side platform 114, or computing devices of the attribution partners 126, 128 and the advertisers/clients 118, 120).

As mentioned above, the real-time experimentation system 100 conducts a media lift experiment for a first advertiser/client 118 utilizing a placebo ad from a second advertiser/client 120. To illustrate in relation to FIG. 1, the viewer computing device 108 visits the media property 106 that includes the ad slot 104 (e.g., a website with a sidebar advertisement slot). The supply-side platform 102 detects that the viewer computing device 108 is visiting the media property (e.g., detects a request from the viewer computing device 108 to a remote server hosting the website via, for example, a tracking pixel) and holds an ad slot auction within milliseconds. Specifically, the supply-side platform 102 sends a bid request package to the demand-side platform 114. In response, the demand-side platform 114 analyzes the bid request package to conduct a media lift experiment for the first advertiser/client 118.

In one or more embodiments, the demand-side platform 114 analyzes the bid request package and determines that the viewer of the viewer computing device 108 belongs to a control group. For example, the demand-side platform 114 determines that the viewer computing device 108 has previously been assigned to a control group (or the demand-side platform 114 can assign the viewer to a control group based on a randomizing algorithm and control frequency threshold value). The demand-side platform 114 analyzes the bid request package to determine whether the bid request package satisfies campaign parameters corresponding to the first advertiser/client 118 and/or campaign parameters corresponding to the second advertiser/client 120.

Upon determining that the viewer corresponds to a control group, that the bid request package satisfies campaign parameters of the first advertiser/client 118, and that the bid request package satisfies the campaign parameters of the second advertiser/client 120, the demand-side platform 114 selects the advertisement 120a corresponding to the second advertiser/client 120 as a control ad. Moreover, the demand-side platform 114 sends a bid response to the supply-side platform 102 with the second advertisement 120a and a corresponding bid. The supply-side platform 102 analyzes the bid and provides the second advertisement 120a to the viewer computing device 108 as part of the media property 106 (e.g., within the ad slot 104).

The real-time experimentation system 100 then detects and analyzes user interaction with the second advertisement 120a at the viewer computing device 108. For example, the real-time experimentation system 100 measures conversions (e.g., clicks, purchases, views) of the viewer computing device 108 by utilizing cookies 124 or tracking pixels placed by the first attribution partner 126 and/or the second attribution partner 128. The demand-side platform 114 also charges the second advertiser/client 120 for placement of the advertisement 120a.

Although the foregoing example identifies the viewer computing device 108 as belonging to a control group, the real-time experimentation system 100 can also determine that viewer computing devices correspond to a test group. To illustrate, the real-time experimentation system 100 can determine that a viewer computing device has previously been assigned to a test group or the real-time experimentation system 100 can assign the viewer computing device to a test group based on a randomizing algorithm and control frequency threshold value. Upon determining that the viewer computing device belongs to a test group and the bid request package satisfies campaign parameters of the advertiser/client 118, the real-time experimentation system 100 can select the advertisement 118a as a test ad. Moreover, the demand-side platform 114 can provide the advertisement 118a (and a corresponding bid) to the supply-side platform 102 for display to the viewer computing device. The real-time experimentation system 100 then monitors user interaction with the advertisement 118a (e.g., measure, conversions resulting from the advertisement 118a).

As mentioned above, the real-time experimentation system 100 can also compare performance of control ads and test ads (e.g., compare user interactions with control ads with user interactions with test ads). Indeed, the real-time experimentation system 100 can compare conversions resulting from the advertisement 118a and the second advertisement 120a. Moreover, the real-time experimentation system 100 can determine a measure of media lift based on the comparison. For example, the real-time experimentation system 100 (e.g., via the demand-side platform 114) determines an increase (or decrease) in conversion percentage resulting from the advertisement 118a relative to the second advertisement 120a. The real-time experimentation system 100 (e.g., via the demand-side platform) can also generate (and/or implement) modifications to a campaign parameters of the first advertiser/client 118 based on the measure of media lift. The demand-side platform 114 can then conduct and/or modify an online advertisement campaign based on the modified campaign parameters.

Notably, the demand-side platform 114 can conduct a media lift experiment, generate a measure of media lift, and/or implement modifications to an online ad campaign for the first advertiser/client 118 without the need to charge the first advertiser/client 118 for standardized control ads. Indeed, by utilizing the second advertisement 120a corresponding to the second advertiser/client 120, the real-time experimentation system 100 can charge the second advertiser/client 120 for the second advertisement 120a and avoid imposing costs on the first advertiser/client 118 for control ads.

Figure 2:
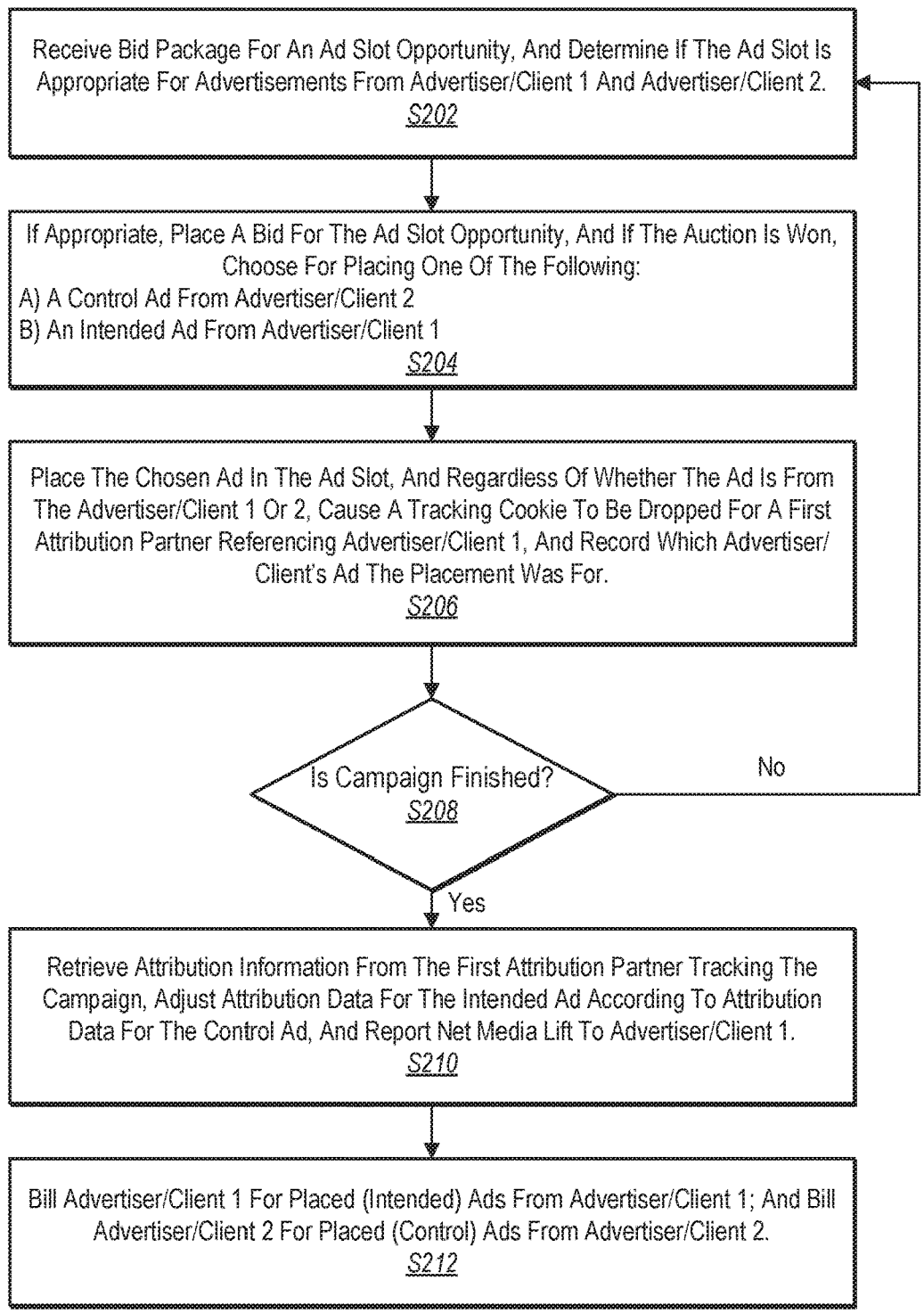
FIG. 2 shows a flow chart of conducting a media lift experiment for an advertiser/client 1 where some ads from advertiser/client 2 act as control ads for advertiser/client 1's campaign, the study conducted at no additional cost to the advertiser/clients, in accordance with one or more embodiments.

Turning now to FIG. 2, additional detail will be provided regarding conducting a media lift experiment in accordance with one or more embodiments of the real-time experimentation system 100. In particular, FIG. 2 shows a flow chart for an exemplary and non-limiting embodiment where the real-time experimentation system 100 conducts a media lift experiment for advertiser/client 1 with some ads from advertiser/client 2 acting as control ads for advertiser/client 1's campaign, and with the study conducted at no additional cost to advertiser/client 1. In step S202, the real-time experimentation system 100 receives a bid request package for an ad slot opportunity, and determines if the ad slot is appropriate for advertisements from advertiser/client 1 and advertiser/client 2. For example, the real-time experimentation system 100 can compare campaign parameters (e.g., targeting parameters) from advertiser/client 1 with a bid request package to determine that the ad slot is appropriate for advertisements from advertiser/client 1. Similarly, the real-time experimentation system 100 can compare campaign parameters from advertiser/client 2 with a bid request package to determine that the ad slot is appropriate for advertisements from advertiser/client 2.

In step S204 the real-time experimentation system 100 places a bid (including ad information) for the ad slot, and, if the auction is won, the real-time experimentation system 100 chooses either a control ad from advertiser/client 2 or an intended ad from advertiser/client 1 to be placed in the ad slot. For example, the real-time experimentation system 100 can choose a control ad from advertiser/client 2 for a viewer corresponding to a control group. Moreover, the real-time experimentation system 100 can choose a test ad from advertiser/client 1 for a viewer corresponding to a test group.

In step S206, the real-time experimentation system 100 places the chosen ad, and regardless of whether the ad is from advertiser/client 1 or advertiser/client 2, drops a tracking cookie dropped (e.g., by a first attribution partner) referencing advertiser/client 1's ad. Also, the real-time experimentation system 100 records for whichever advertiser/client's ad the placement is made. In step S208, the real-time experimentation system 100 compares progress of the campaign compared with a completion target, and if the campaign is not finished proceeds back to step S202.

If per step S208 the campaign has completed, then the real-time experimentation system 100 proceeds to step S210 and retrieves information from the first attribution partner. The real-time experimentation system 100 adjusts the attribution data for the intended ad according to attribution data for the control ad. The real-time experimentation system 100 then presents a measure of media lift resulting from this adjustment to advertiser client 1, thereby providing a more accurate media lift analysis for advertiser/client 1's intended ad. Finally, per step S212, the real-time experimentation system 100 bills the advertiser/client 1 for placements of the intended ad, and bills the advertiser/client 2 for placements of the control ad.

Note that the control ad can be a blank or unrelated ad, and when it is placed a cookie is dropped by the first attribution partner referencing advertiser/client 1's intended ad. Advertiser/client 1 may be billed, or not billed, for the blank/unrelated ad placement. Furthermore, although FIG. 2 illustrates the step S210 (retrieving attribution data) occurring after the step S208 (after the campaign has completed), in one or more embodiments, the real-time experimentation system 100 receives attribution data while an online campaign is ongoing. For example, the real-time experimentation system 100 can monitor and/or obtain updating attribution data during an online campaign and modify campaign parameters during the online campaign.

Figure 3:
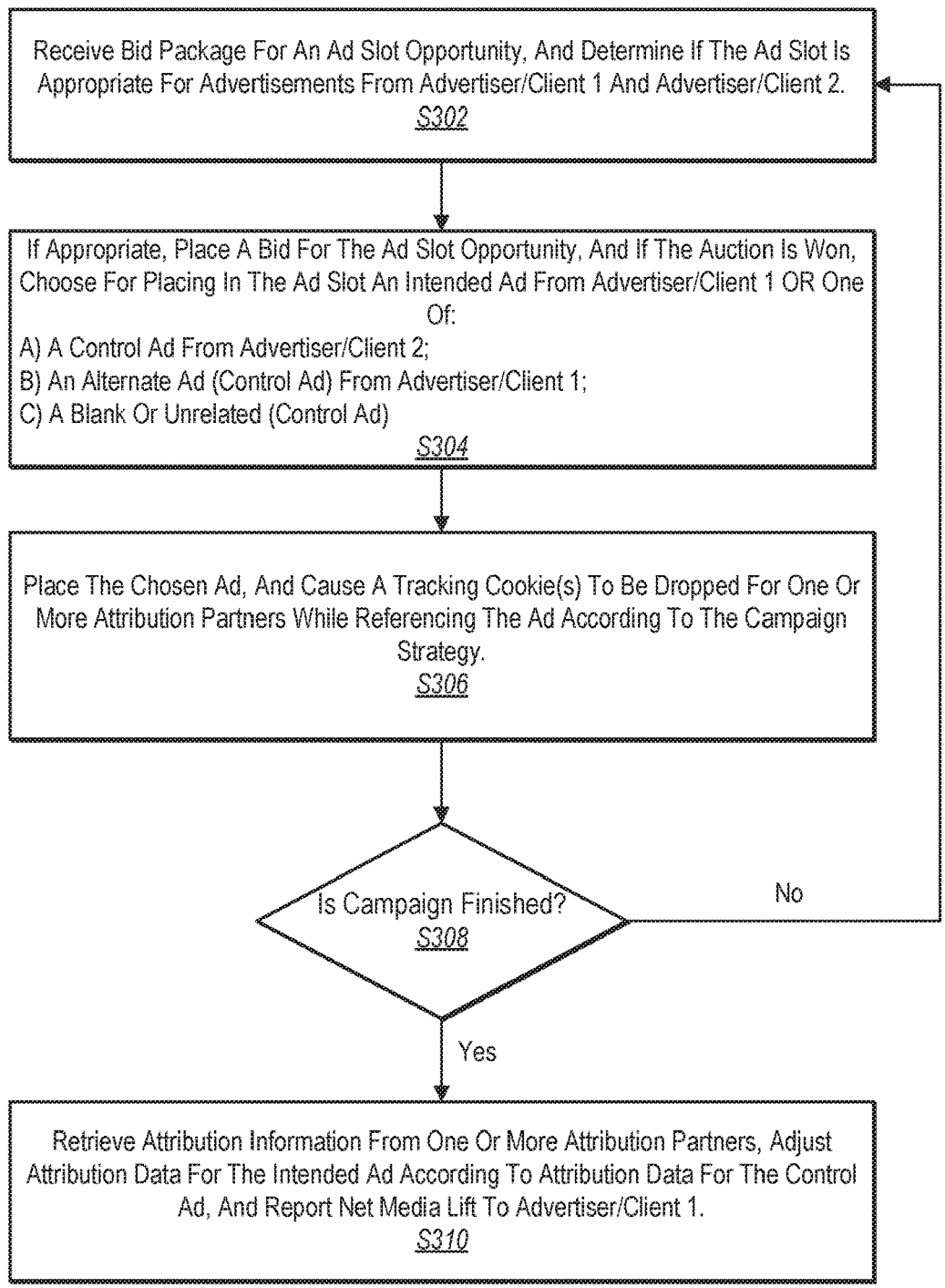
FIG. 3 shows a flow chart for campaign management with always-on media lift studies in accordance with one or more embodiments.

FIG. 3 shows a flow chart depicting a generalized flow for campaign management with always-on media lift studies (i.e., media lift experiment conducted in real-time during one or more campaigns for one or more advertisers) in accordance with one or more embodiments of the real-time experimentation system 100. In step S302, a bid package is received for an ad slot opportunity. The real-time experimentation system 100 determines if the ad slot is appropriate for advertisements from advertiser/client 1 and advertiser/client 2. In particular, the real-time experimentation system 100 can determine whether the ad slot (e.g., the viewer) satisfies the campaign parameters of the advertiser/client 1 and the advertiser/client 2. If appropriate, per step S304, the real-time experimentation system 100 places an ad for the ad slot opportunity. If the auction is won, the real-time experimentation system 100 chooses an intended ad from advertiser/client 1 or one of the following for the ad slot: a) a control ad from advertiser/client 2; b) an alternate ad (control ad) from advertiser/client 1; or c) a blank or unrelated (control) ad.

In step S306, the real-time experimentation system 100 places the chosen ad in the ad slot, and drops one or more tracking cookies (e.g., for one or more attribution partners) referencing the chosen ad according to the campaign strategy. If the placement is for the intended ad from advertiser/client 1, then the real-time experimentation system 100 drops a tracking cookie by a first attribution partner and references the intended ad. If the placement is for the control ad from advertiser/client 2, then the real-time experimentation system 100 drops one tracking cookie via a first attribution partner referencing the intended ad (advertiser/client 1's ad), and optionally drops another tracking cookie via a second attribution partner referencing the control ad (advertiser/client 2's ad), such that advertiser/client 2 will still receive attribution information even when the ad for advertiser/client 2 is used as a control ad in advertiser/client 1's media lift study.

In step S308, the real-time experimentation system 100 compares progress of the campaign with a completion target, and if the campaign is not finished, the real-time experimentation system 100 proceeds back to step S302. If per step S308, the campaign has completed, then the real-time experimentation system 100 proceeds to step S310, where information is retrieved from the first attribution partner (and/or the second attribution partner). The real-time experimentation system 100 adjusts attribution data for the intended ad according to attribution data for the control ad. The real-time experimentation system 100 presents the net media lift resulting from this adjustment to advertiser/client 1, thereby providing a more accurate media lift analysis for advertiser/client 1's test ad. If the real-time experimentation system 100 drops a second tracking cookie for a second attribution partner when placing the control ad, then the real-time experimentation system 100 can also report attribution information to advertiser/client 2 for placements of the ad from advertiser/client 2 (the control ad) as part of advertiser/client 2's campaign. Subsequently, the real-time experimentation system 100 bills the advertiser/client 1 for placements of the intended ad, and bills the advertiser/client 2 for placements of the control ad and any other placements of advertiser/client 2's ad. Results of media lift studies for all embodiments described herein are typically provided to advertiser/clients at least in electronic form suitable for display on a computer display.

As mentioned above, in one or more embodiments, the real-time experimentation system 100 runs simultaneous media lift studies for both advertiser/client 1 and advertiser/client 2 (at no additional cost to either advertiser). In particular, a portion of advertiser/client 1's intended ads become control ads for advertiser/client 2's campaign, and likewise a portion of advertiser/client 2's intended ads become control ads for advertiser/client 1's campaign, with both campaigns running simultaneously. Thus, the real-time experimentation system 100 can run a form of "cross coupled" experiment. Again, neither advertiser/client has paid extra for bidding on and winning bids for control ads to determine media lift on their ads.

Accordingly, in one or more embodiments, when advertiser/client 2's intended ad is placed as a control ad for advertiser/client 1's campaign, the real-time experimentation system 100 drops two cookies:

a) one cookie by the first attribution partner referencing advertiser/client 1's ad; and b) one cookie by the second attribution partner referencing advertiser/client 2's ad.

Likewise, when advertiser/client 1's intended ad is placed as a control ad for advertiser/client 2's campaign, the real-time experimentation system 100 drops two cookies:

a) one cookie by the first attribution partner referencing advertiser/client 1's ad; and b) one cookie by the second attribution partner referencing advertiser/client 2's ad.

Subsequently when both campaigns have completed (or while both campaigns are ongoing, depending on the embodiment), the real-time experimentation system 100 obtains and reconciles attribution data via both the first and second attribution partners. The real-time experimentation system 100 generates net media lift results for advertiser/client 1's campaign by subtracting conversion results for the control ad (from advertiser/client 2) from conversion results for advertiser/client 1's intended ad. Likewise, the real-time experimentation system 100 generates net media lift results for advertiser/client 2's campaign by subtracting conversion results for the control ad (from advertiser/client 1) from conversion results for advertiser/client 2's intended ad.

To illustrate, assume for example that attribution data indicates test ads for advertiser/client 1 resulted in 30% of conversions, but the control ads (the substituted ads that really belong to advertiser/client 2) was attributed with 5% of conversions. Then in reporting media lift results, the real-time experimentation system 100 adjusts the numbers for advertiser/client 1's display ad conversions to 25%.

In addition to conversion percentage, the real-time experimentation system 100 can utilize a similar approach to generate a variety of media lift measures. For example, the real-time experimentation system 100 can determine incremental conversion improvement of the advertiser/client 1 ad in relation to alternative advertisers. Media lift results are typically supplied to advertiser/clients in electronic form suitable for viewing on a computer display.

Furthermore, although FIGS. 2 and 3 describe example embodiments of the real-time experimentation system 100 that utilize advertisements from only two advertiser/clients, the real-time experimentation system 100 can conduct media lift experiments with a variety of different advertiser/clients. For example, the real-time experimentation system 100 can conduct a media lift experiment for a first advertiser by replacing advertisements of the first advertiser from a pool of alternative advertisements from a plurality of alternative advertisers. Specifically, the real-time experimentation system 100 can analyze the pool of alternative advertisements and a bid request package to determine an advertisement with targeting parameters that match the bid request package. The real-time experimentation system 100 can then replace the first advertisement for the first advertiser with the alternative advertisement. Thus, the real-time experimentation system 100 can replace the first advertisement with a variety of different alternative advertisements from a variety of different alternative advertisers in response to different bid request packages.

As mentioned above, in one or more embodiments the real-time experimentation system 100 executes a placebo experiment by creating an ad placement for a media lift experiment, executing the media lift experiment, and tracking and rolling up the results of the media lift experiments in a statistics platform to make the results available in a user interface. More particularly, the real-time experimentation system 100 can define experiment parameters, including control frequency, test groups, and control groups. The real-time experimentation system 100 can utilize a user interface and API functionality to make results available for both test and control group statistics. Moreover, the real-time experimentation system 100 can suggest revisions to campaign parameters based on the results of the media lift experiments.

As just mentioned, in one or more embodiments the real-time processing system 100 decides within an experimental placement which ad slot opportunities should be served a control ad as opposed to a test ad. In particular, for viewers of an experiment placement who have not yet been placed in either a control or exposed group, a randomizing function is applied that for one exemplary implementation performs a hash function on a combination of an experiment ID (i.e., an identification number specific to the media lift experiment) and a viewer ID (i.e., an identification number specific to a particular viewer). For example, FIG. 4 shows an operational overview diagram for an exemplary medial lift experiment in accordance with one or more embodiments of the real-time experimentation system 100.

Figure 4:
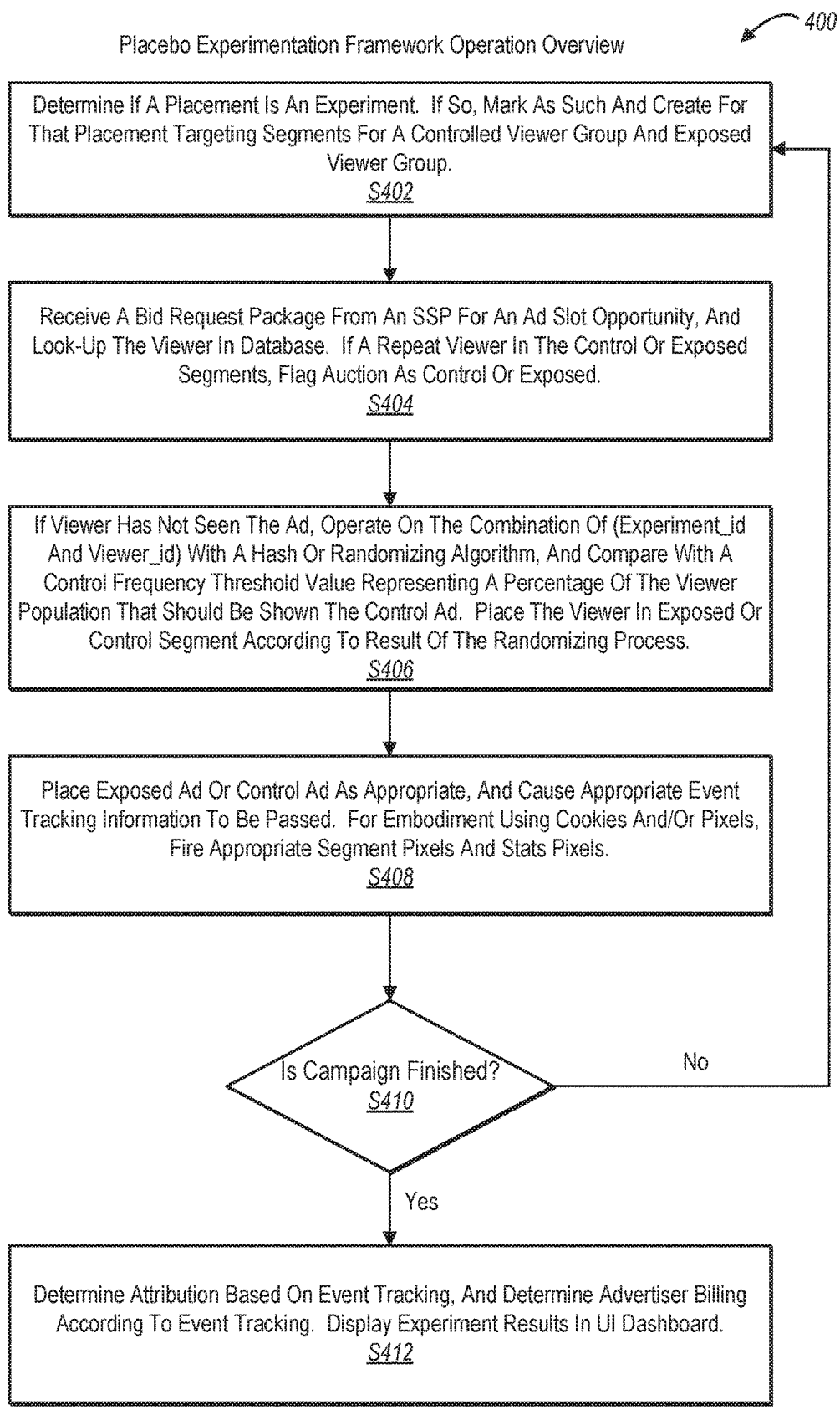
FIG. 4 shows a placebo workflow diagram of an exemplary system according to one or more embodiments.

As shown in FIG. 4, at step S402, the real-time experimentation system 100 determines if a new placement is to be an experiment. Specifically, the real-time experimentation system 100 can analyze a bid request package and determine if an impression opportunity corresponding to the bid request package will be utilized for an experiment. The real-time experimentation system 100 can determine whether a placement is to be an experiment based on a variety of factors. For example, the real-time experimentation system 100 can determine whether the bid request package has a viewer id (i.e., an identifier that allows the real-time experimentation system 100 to monitor the viewer across different bid request packages). If the bid request package does not have a viewer id, in one or more embodiments, the real-time experimentation system 100 will not utilize the placement as part of an experiment. If so, the real-time experimentation system 100 can mark the bid request package as experimental (e.g., assign an experiment ID corresponding to the medial lift experiment).

As shown in FIG. 4, per step S404, upon receiving a bid request package for an ad slot opportunity, the real-time experimentation system 100 looks up the viewer in a viewer database store. Different database types can be used for this purpose. In one or more embodiments, the real-time experimentation system 100 utilizes a database commonly referred to as "Dynamo." Dynamo is a fast and flexible NoSQL database service for applications that need consistent, single-digit millisecond latency at any scale. It is a fully managed cloud database and supports both document and key-value store models.

Moreover, per step S404, if the viewer is a repeat viewer already assigned to one of the control or exposed segments (i.e., control or test groups), the real-time experimentation system 100 flags the auction (i.e., flags the bid request package and/or viewer) based on the previous assignment. Specifically, the real-time experimentation system 100 can flag the auction as already assigned to a particular experiment segment.

Note that the real-time experimentation system 100 can determine that a viewer is already known—and that they may or may not be part of an experiment or experiment segment—at any time. Indeed, although FIG. 4 shows the step S404 following receipt of a bid request package, the real-time experimentation system 100 can make these determinations prior to receiving the bid request package or at some other time.

As shown in FIG. 4, per step S406, if the viewer has not previously been assigned to a control group or test group, the real-time experimentation system 100 assigns the viewer to a control group or a test group. Specifically, the real-time experimentation system 100 can apply a hash or randomizing algorithm together with a control frequency threshold value to assign the viewer to a control group or a test group. To illustrate, the real-time experimentation system 100 can operate on the combination of the experiment ID and the viewer ID with a hash or randomizing algorithm, and compare the results of the randomizing procedure with a control frequency threshold value. This value represents a percentage of the viewer population that should be shown the control ad. The real-time experimentation system 100 places the viewer in exposed or control segment according to result of the randomizing process.

For example, the real-time experimentation system 100 can apply a hash value between 1 and 100 to a particular viewer id and experiment id. The real-time experimentation system 100 can also apply a control frequency threshold indicating that 30% of the viewers should be assigned to a control group. Thus, for example, the real-time experimentation system 100 can assign a viewer id with a hash value between 1 and 30 to the control group and a viewer id with a hash value between 31 and 100 to the test group.

Note that the real-time experimentation system 100 can utilize a fixed control frequency threshold value (e.g., a fixed value that has produced optimum results over a broad spectrum of placebo experiment campaigns). Alternately, the real-time experimentation system 100 can utilize a control frequency threshold set for one or more specific experimental placements where it is determined that the percentage of control adds to be placed are higher or lower than a typical amount.

After determining whether the viewer belongs to a control group or test group, the real-time experimentation system 100 can place either the control ad or the test ad (as appropriate to the determined group) and track user interaction with the placed ad. Indeed, as shown in FIG. 4, per step S408, the real-time experimentation system 100 places the exposed ad or control ad, and passes appropriate event tracking information. For example, in one or more embodiments utilizing tracking pixels, the real-time experimentation system 100 fires appropriate segment pixels and stats pixels. Segment pixels can cause the real-time experimentation system 100 to update the viewer database at the demand-side platform. Moreover, stats pixels assist the demand-side platform in keeping track of placement information (e.g., as relates to requirements for billing).

Figure 7:
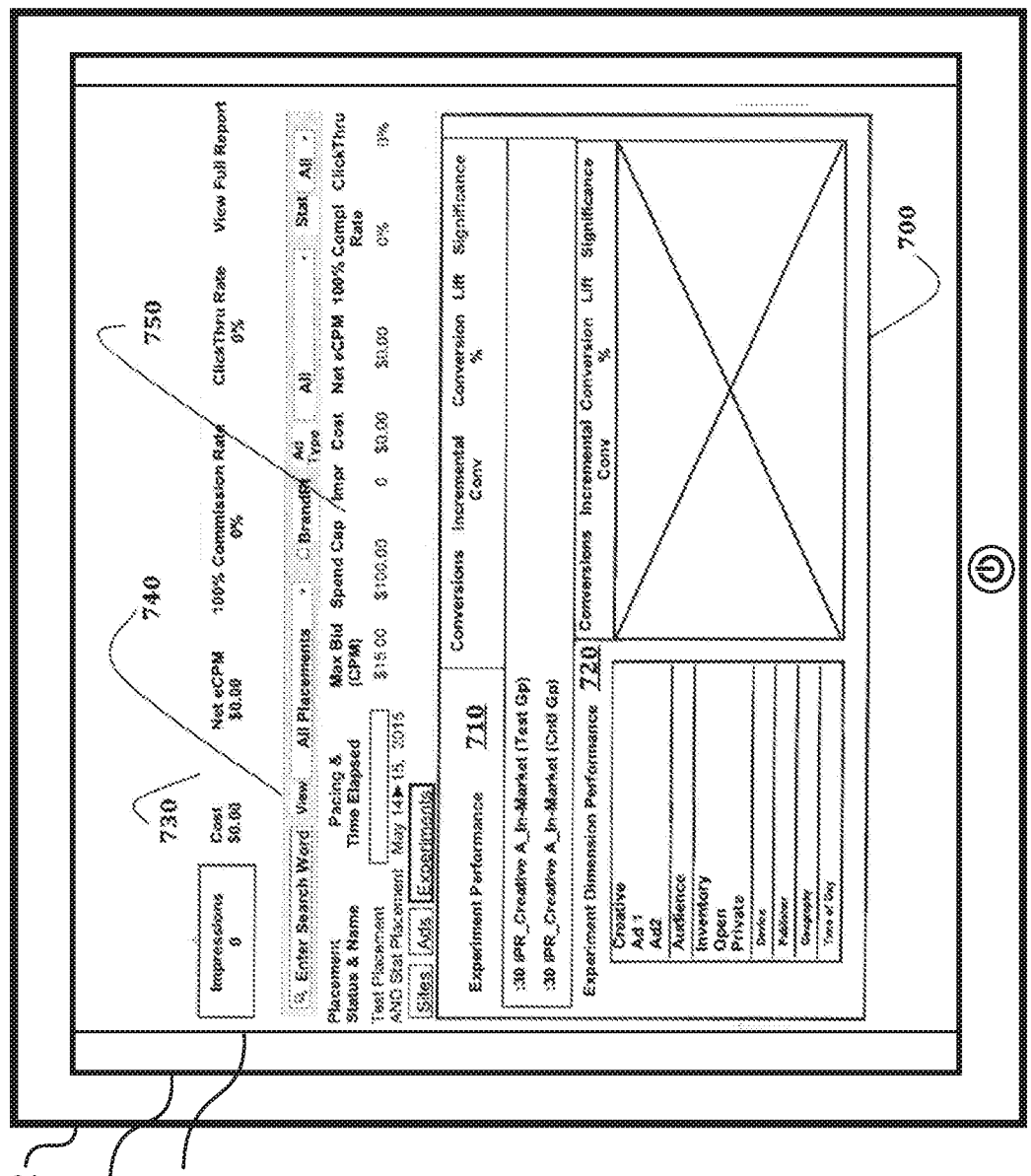
FIG. 7 shows a user interface for presenting measures of media lift in accordance with one or more embodiments.
Figure 8:
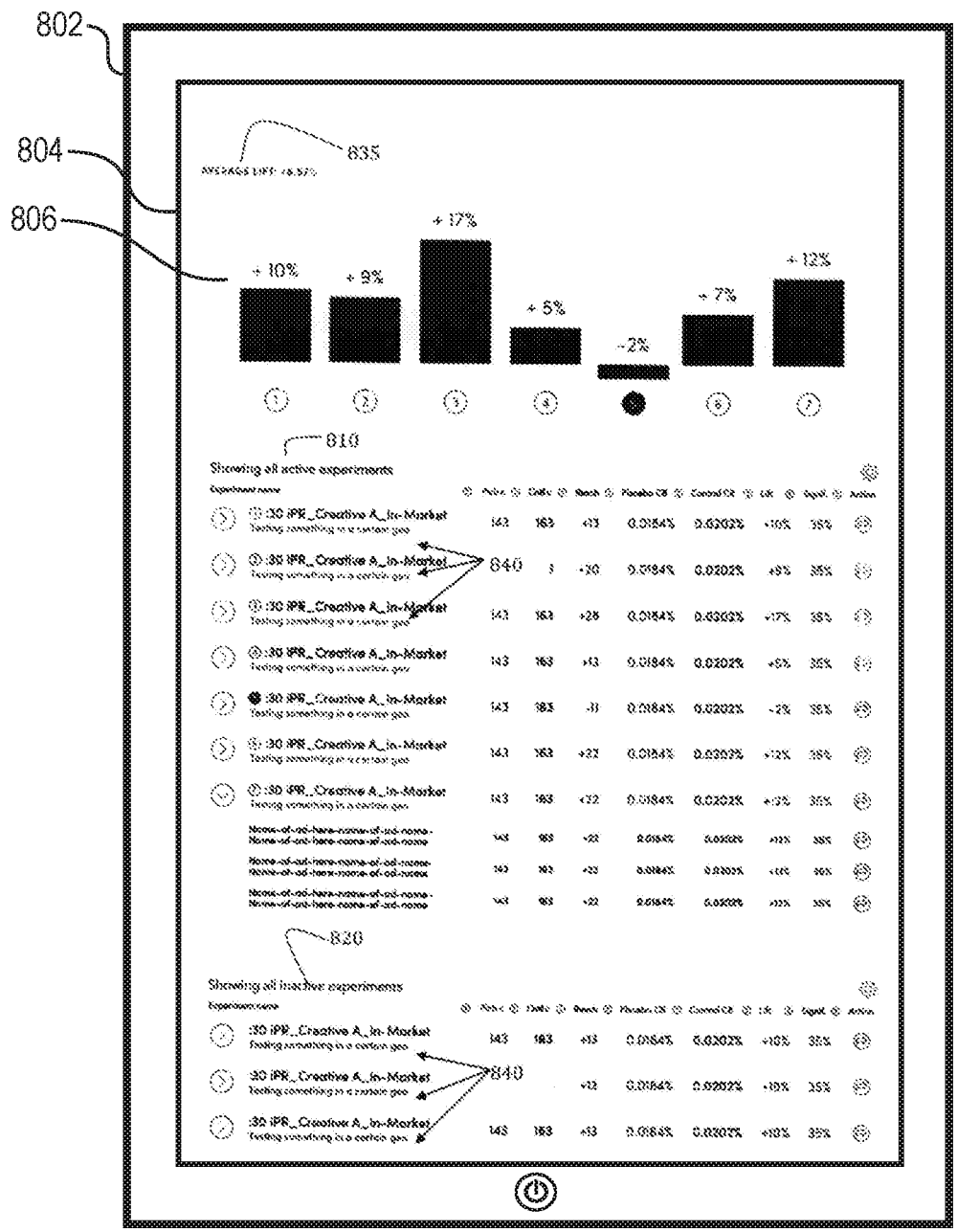
FIG. 8 illustrates another user interface for presenting measures of media lift in accordance with one or more embodiments.

As illustrated in FIG. 4, in step S410, the real-time experimentation system 100 determines if the campaign has completed. Moreover, in step S412, the real-time experimentation system 100 determines attribution for the campaign based on event tracking. For example, the real-time experimentation system 100 determines conversions and determined advertiser billing according to the event tracking. Furthermore, the real-time experimentation system 100 rolls up experimental results into the user interface dashboard (e.g., as illustrated in FIGS. 7 and 8 below).

Figure 5:
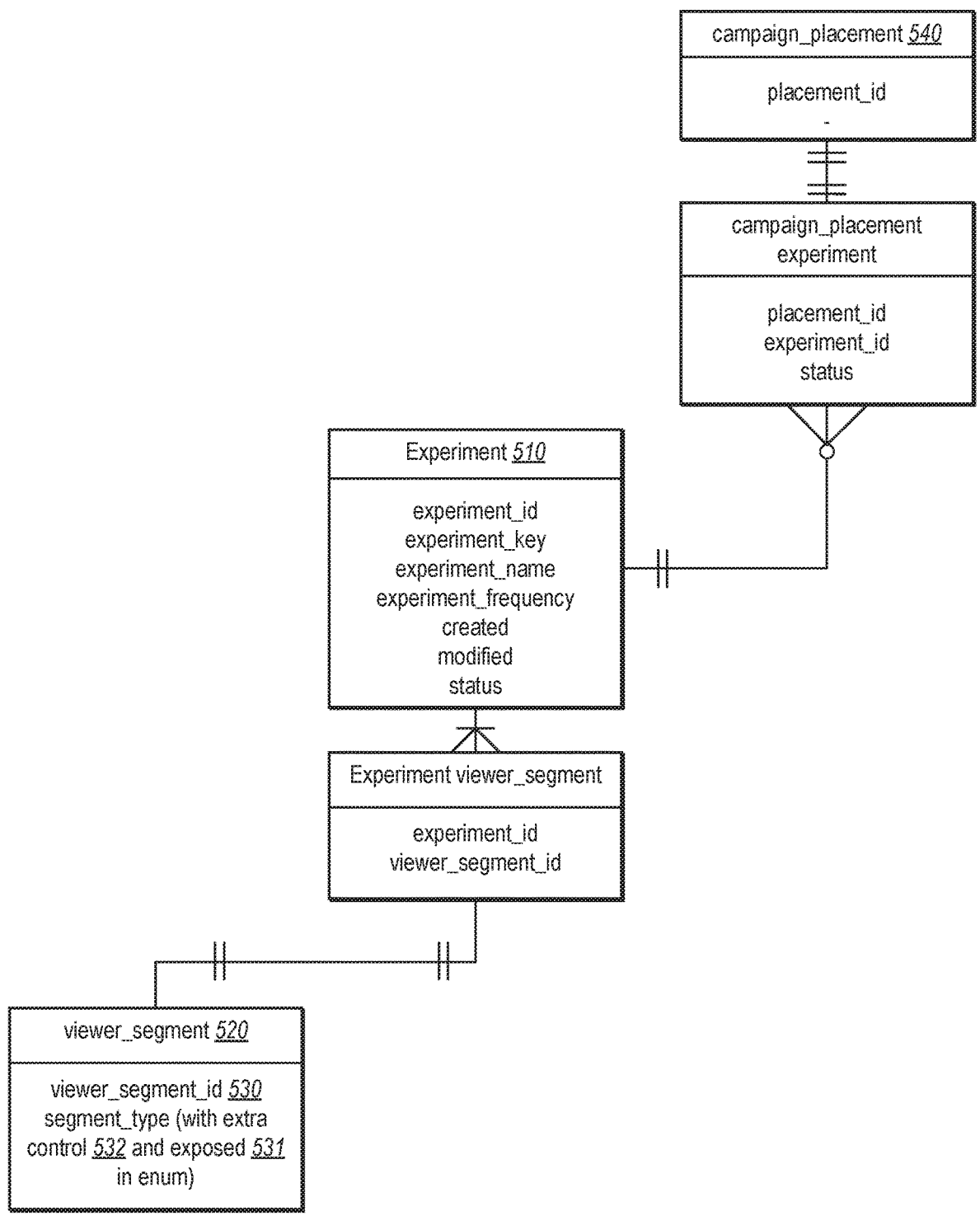
FIG. 5 shows a data model where a placement is marked as an experiment via a new entry on a placement experiment table in accordance with one or more embodiments.

Turning now to FIG. 5 additional detail will be provided regarding a data model utilized to implement media lift experiments according to one or more embodiments. In particular, FIG. 5 illustrates a data model of parameters for utilizing the real-time experimentation system 100 to run a media lift experiment. As shown in FIG. 5, for an experiment 510, the real-time communication system 100 can generate a plurality of parameters, including, for example, an experiment_id (e.g., a unique number identifying the experiment), an experiment_key (e.g., a key for accessing or modifying the experiment), an experiment_name (e.g., name of the experiment), an experiment_frequency (e.g., how often or how frequently to run the experiment), created (e.g., when the experiment was created), modified (e.g., when the experiment has been modified), and status (e.g., if the experiment is ongoing or complete). For a particular placement (e.g., advertisement slot) in an experiment, the real-time communication system 100 can generate a new entry on the placement_experiment table 540. As shown, the placement experiment table 540 can include a placement_id (e.g., an identifier for the advertisement slot) that corresponds to the experiment_id and status.

Furthermore, in addition to marking the placement as an experiment (e.g., within the placement experiment table 540), the real-time experimentation system 100 can generate targeting segments (e.g., for controlled 532 and exposed 531 viewer groups), which the real-time experimentation system 100 links to the experiment via a viewer_segment table 520. In this manner, the real-time experimentation system 100 can track viewers, segments, placements, and the number of viewers assigned to particular segments. For example, the real-time experimentation system 100 can generate a viewer_segment_id 530 (e.g., for each viewer) together with a segment_type (e.g., control 532 and exposed 531 types). Thus, the real-time experimentation system 100 tracks the viewer, what segment (e.g., control or exposed group) the viewer has been assigned and what placements the viewer is associated with. Moreover, the real-time experimentation system can add enums for exposed segments and control segments. An enum is a type that only allows a set of finite options, and each option corresponds to a number. By default, those numbers are increasing in the order the values are declared, starting from zero. Accordingly, the real-time experimentation system 100 can also track the number of viewers corresponding to a particular segment type and the number of advertisements a viewer has received.

Figure 6:
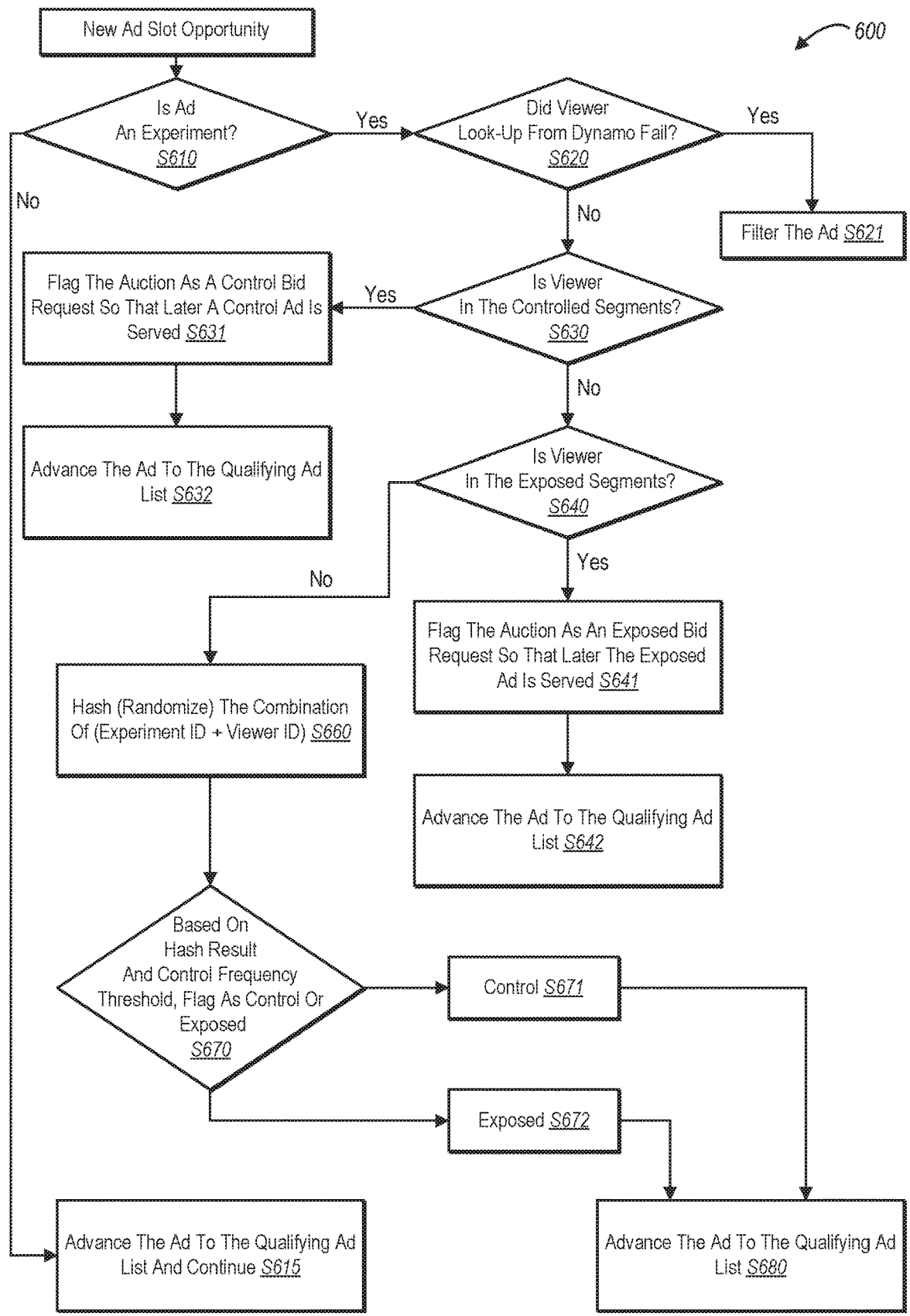
FIG. 6 shows a flowchart for an exemplary process of advancing ads to viewers in accordance with one or more embodiments.

Turning now to FIG. 6, additional detail is provided regarding a media lift experiment in accordance with one or more embodiments of the real-time experimentation system 100. In particular, FIG. 6 shows a flowchart for an exemplary process 600 performed by the real-time experimentation system 100.

The real-time experimentation system 100 receives an ad slot opportunity (i.e., a bid request package) by a demand-side platform from a supply-side platform. If the bid request is missing a viewer ID, the real-time experimentation system 100 generally does not consider the bid request for inclusion in an experiment. Next the real-time experimentation system 100 decides (S610), if the ad is an experiment. If so, the real-time experimentation system 100 places the viewer in a controlled or exposed group according to the following steps described in the process 600.

If the viewer look-up from the viewer database (e.g., Dynamo) failed (S620) indicating that the viewer associated with the ad slot opportunity has not been seen before, then the ad is filtered (S621). If viewer is in the controlled segments (S630): flag the auction as a control bid request so that later a control ad is served (S631); and advance the ad to the qualifying ad list (S632).

Check if viewer is in the exposed segments (S640): If so, flag the auction as an exposed bid request so that the exposed ad is served (S641); and advance the ad to the qualifying ad list (S642). If the viewer has not seen the controlled or exposed ad (or been assigned to an exposed group or control group): perform a hash or other randomization function (S660) on the combination of (experiment ID+viewer ID); based on the hash and the control frequency threshold, decide whether to flag the auction (S670) as a control (S671) or exposed (S672) bid request; and advance the ad to the qualifying ad list (S680). If the ad is not an experiment, advance the ad to the qualifying ad list and continue (S615).

As mentioned above, in one or more embodiments, the real-time experimentation system 100 also monitors performance of test ads and control ads and generates a user interface portraying a measure of media lift. To illustrate, the real-time experimentation system 100 can build a reporting API (i.e., a set of subroutine definitions, protocols and tools for building software and applications), to make test and control stats available to a user interface while adding performance statistics (i.e. measures of media lift) to the reporting user interface. In addition, the real-time experimentation system 100 can generate the user interface dashboard such that a user can control a number of aspects of an online ad campaign and media lift experiment, including how ads are chosen within an experiment to be test ads or control ads.

In generating a user interface for an experimental placement, the real-time experimentation system 100 may include a number of options for an advertiser/client to control a media lift experiment and/or online ad campaign. For example, from the user interface dashboard a user may choose the control ad. For instance, the user interface can allow the advertiser client to select a control ad from any of: a) an alternate ad belonging to the first advertiser/client; b) an ad belonging to a second advertiser client; c) a public service add; or d) a blank ad.

In addition to interface elements for selecting the control ad, the real-time experimentation system 100 can also provide a variety of other selectable options. For example, the real-time experimentation system 100 can include options within a user interface dashboard that allow users to select any or all of: a) the attribution methodology, including which attribution partners (if any) are to be used for the experiment; b) the type of control ad; c) the specific choice of control ad; d) the control frequency threshold that determines what percentage of a population will receive a control ad for a particular placement; or e) targeting parameters.

The real-time experimentation system 100 can also provide a variety of options in relation to attribution. For example, the real-time experimentation system 100 can provide options for different types of attribution. To illustrate, some media lift experiments utilize "last touch" attribution strategies (i.e., attribution based on the last impression related to a conversion). In other media lift experiments utilize "any touch" attributions strategies (i.e., attribution based on any impression related to a conversion). The real-time experimentation system 100 can support either "last touch" attribution, "any touch" attribution strategies, or other attribution strategies (e.g., a weighted combination of last touch and any touch). Moreover, the real-time experimentation system 100 can provide selectable options that allow a user to select a preferred attribution strategy. Further, as discussed above, the real-time experimentation system 100 can track and attribute conversions in relation to test ads and control ads separately.

Moreover, the real-time experimentation system 100 can provide options for attribution sources. Indeed, attribution can be performed solely by a demand-side platform operating the media lift experiment, or alternatively using external third-party attribution partners. The real-time experimentation system 100 can allow client/advertiser to control attribution sources via a user interface.

In addition, in one or more embodiments, both demand-side platform attribution and third-party attribution can be utilized simultaneously. Moreover, the real-time experimentation system 100 can utilize media lift experiments to compare attribution results from different sources. To illustrate, the real-time experimentation system 100 can utilize conversion results from demand-side platform attribution to determine the relative accuracy of conversion results reported by third-party attribution partners.

Indeed, utilizing conventional systems, advertisers/clients can receive attribution results from third-party attribution partners indicating the attribution of particular ads to particular conversions. For example, a viewer of an ad may have seen both display and video ads for the same item and the attribution company would apply a set of rules to assign partial conversions to each ad. To illustrate, a specific conversion may be 50% attributed to the video ad, 50% to the display ad. Under conventional systems, advertisers/clients do not know if these attribution rules are accurate. The real-time experimentation system 100 can allow advertisers/clients to determine the accuracy of such data. Indeed, analysis results may also be compared between different attribution partners (attribution data providers) to determine which provide the more accurate attribution data. The real-time experimentation system 100 can then provide analysis results via a user interface dashboard.

Furthermore, the real-time experimentation system 100 can also perform different types of experiments. For example, in one or more embodiments, the real-time experimentation system 100 performs a "leaky" media lift experiment, where viewers in a test group are exposed to a test ad from a first advertiser and other advertisements from the first advertiser. In other embodiments, the real-time experimentation system 100 performs traditional medial lift experiments that do not provide multiple advertisements from the same advertiser to viewers in a test group. The real-time experimentation system 100 can provide selectable options for users via a user interface to select a leak or traditional media lift experiment.

For example, FIG. 7 illustrates a sample user interface generated by the real-time experimentation system 100 in accordance with one or more embodiments. In particular, FIG. 7 shows a computing device 702 with a display 704 portraying an exemplary user interface dashboard 706. In particular, the user interface dashboard 706 contains a variety of elements whereby a user can define parameters for an experiment and also observe experimental results 700 (e.g., measures of media lift) as rollups of conversions indicating experiment performance 710 for the test group versus the control group across campaign dimensions 720. Indeed, FIG. 7 illustrates campaign dimensions including: creatives for different ads used in the experiment; audience parameters; inventory by type; device; publisher; geography; and time of day. This exemplary user interface dashboard enables users to see experimental results by desired cross sections. Moreover, a quick summary 730 of results is shown (i.e., at the top of the user interface) including impressions, costs, net eCPM (i.e., net effective cost per thousand impressions), 100% commission rate, click through rate, and a selectable option to view a full detailed report.

Moreover, as discussed above, the real-time experimentation system 100 can also include user interface elements for controlling placements and experiments. In particular, FIG. 7 illustrates the control bar 740, which control specific campaign parameters 750 for each placement shown including: pacing and elapsed time; max bid; spending cap; impressions; cost; net eCPM; percentage for a 100% completion rate; and click through percentage.

Furthermore, the user interface of FIG. 7 also includes exemplary measures of media lift (e.g., as part of the experiment performance across dimensions 720) including: incremental conversions; conversion percentage; lift; and significance. As mentioned above, the real-time experimentation system 100 can determines the measures of media lift by comparing user interactions with test ads and control ads. The user interface can include a variety of additional measures of media lift, such as clicks attributable to a test ad or a change in clicks attributable to a test ad.

For example, the real-time experimentation system 100 can determine a first set of user interactions with a test ad (e.g., a number of placements resulting in clicks and/or a number of placements without clicks) and a second set of user interactions with control ads (e.g., a number of placements resulting in clicks and/or a number of placements without clicks). The real-time experimentation system 100 can compare the first set of user interactions with the test ad and the second set of user interactions with the control ad to determine a measure of media lift (e.g., determine incremental improvement in clicks between the test ad and the control ads).

In addition to the elements included in the user interface of FIG. 7, the real-time experimentation system 100 can provide additional aggregated results. For example, FIG. 8 shows a computing device 802 with a display 804 portraying a user interface 806 in accordance with one or more embodiments of the real-time experimentation system 100. As illustrated, the user interface 806 portrays results aggregated and expressed as experimental results 800. In particular, FIG. 8 illustrates an insights dashboard that may be displayed within a user interface (e.g., within the user interface dashboard of FIG. 7). This aggregation is possible across experiments and across accounts and can give aggregate lift results for all experiments, both active 810 and inactive 820. The user interface of FIG. 8 includes placebo ads, control ads, reach, placebo ad conversion rate, control ad conversion rate, lift, and significance. The user interface also includes an "action" interface element for modifying one or more campaign parameters.

The user interface also includes graphical elements 830 indicating a measure of media lift for all active experiments 810. The user interface also includes an element indicating a baseline of average lift 835. The examples shown are all for tests in a specified geographic location 840.

As mentioned above, in one or more embodiments, the real-time experimentation system 100 can perform a leaky media lift experiment or traditional media lift experiment. As discussed, a leaky media lift experiment refers to a media lift experiment where viewers in a test group are exposed to a test ad from a first advertiser in addition to one or more additional advertisements from the first advertiser. In some embodiments, the real-time experiment system 100 implements traditional (i.e., non-leaky) media lift experiments by exposing viewers in a test group only to a single test ad from an advertiser. In this manner, attribution of conversions is simplified, because conversions to the advertiser (e.g., purchases of the advertiser's products or visits to the advertiser's website) can be easily attributed to the test ad.

In a leaky experiment, attribution is more complex. For example, an ad for Apple's MacBook Air could be swapped in, as a placebo, for an exposed ad for Apple's iPhone 7. This is considered "leaky" in that both ads are for the same advertiser (Apple). If a viewer visits the Apple website, attribution for the conversion could be attributed to either advertisement.

As mentioned above, the real-time experimentation system 100 can utilize different attribution strategies in such circumstances. For instance, in a leaky media lift experiment, the real-time attribution system 100 can utilize an any-touch attribution. In this approach, the real-time attribution system can provide a weighted attribution to any advertisement corresponding to a conversion. For instance, if a viewer is exposed to two advertisements (a control ad and a test ad) from the same advertiser, the real-time experimentation system 100 can provide a weighted attribution (e.g., weighted based on time from the conversion) to both the control ad and the test ad.

In other embodiments, the real-time experimentation system 100 utilizes a last touch attribution. For this approach, the real-time attribution system 100 can provide attribution for a conversion to the last advertisement prior to the conversion. In other words, the last ad shown from a given advertiser is examined and given the credit for a particular user interaction. As mentioned above, the real-time experimentation system 100 can support any attribution approach, and provide selectable options for the user to select a particular approach.

To support such leaky experiments, one or more embodiments of the real-time experimentation system 100 collects and/or generates additional data metrics. For example, the real-time experimentation system 100 can generate data metrics for different conversions for placebo ads for a first advertiser in addition to test ads for the first advertiser. For example, the real-time experimentation system 100 can utilize six new metric fields as follows: PLACEBO_VIEW_CONVERSIONS (i.e. conversions of a placebo ad based on views), PLACEBO_VIEW_THROUGH_AVG_TIME (i.e., average view through rate), PLACEBO_ENGAGE_CONVERSIONS (i.e., conversions based on a viewer engaging with the placebo ad), PLACEBO_ENGAGE_THROUGH_AVG_TIME (i.e., average engage through rate), PLACEBO_CLICK_CONVERSIONS (i.e., conversions based on viewer clicking on a placebo ad), PLACEBO_CLICK_THROUGH_AVG_TIME (i.e., average click through rate).

As mentioned above, the real-time experimentation system 100 can track statistics via one or more pixels and then roll those statistics up into a database to determine results of media lift experiments and billing for the experiment. For example, FIG. 9 shows placebo stats 900. The real-time experimentation system 100 emits pixels with new parameters that the real-time experimentation system 100 rolls up into a separate table, where tracking is summarized for an experiment. Specifically, in relation to the embodiment of FIG. 9, the stats are rolled up into an experiment group 910 (e.g., a test group), a placebo group 920 (e.g., a control group), and a main group 930 (e.g., all advertisements shown for a particular advertiser). Moreover, FIG. 9 illustrates the stats in a variety of different experiment implementations. In particular, different rows of the chart illustrated in FIG. 9 show data that rolls up for experiments with no placebo information, with placebo information, with no placebo engagement, with only placebo engagements, and for leaky experiments.

As shown in FIG. 9, the promoted_ad_id (paID) indicates the promoted ad shown to a viewer. Moreover, the expaID indicates the promoted_ad_id for test or exposed ads. The real-time experimentation can query this promoted_ad_id. When these fields are present, the real-time experimentation system 100 can write them into a new table in a database (e.g., Qubole, a database for cloud-scale processing). The real-time experimentation system 100 can utilize this data to drive billing for the experiment. For example, the real-time experimentation system 100 can utilize the main group 930 to bill a first advertiser for all advertisements of the first advertiser (including test ads, but excluding control ads).

As mentioned above, in one or more embodiments, the real-time experimentation system 100 utilizes the results of a media lift experiment to suggest and/or implement modifications to an online ad campaign. For example, the real-time experimentation system 100 can surface suggested revisions to targeting parameters in a user interface based on measures of media lift determined from the media lift experiment. Furthermore, the real-time experimentation system 100 can automatically implement modifications to the online ad campaign. To illustrate, the real-time experimentation system 100 can modify targeting parameters, advertisements, or budgets based on the results of the media lift experiment.

Figure 10:
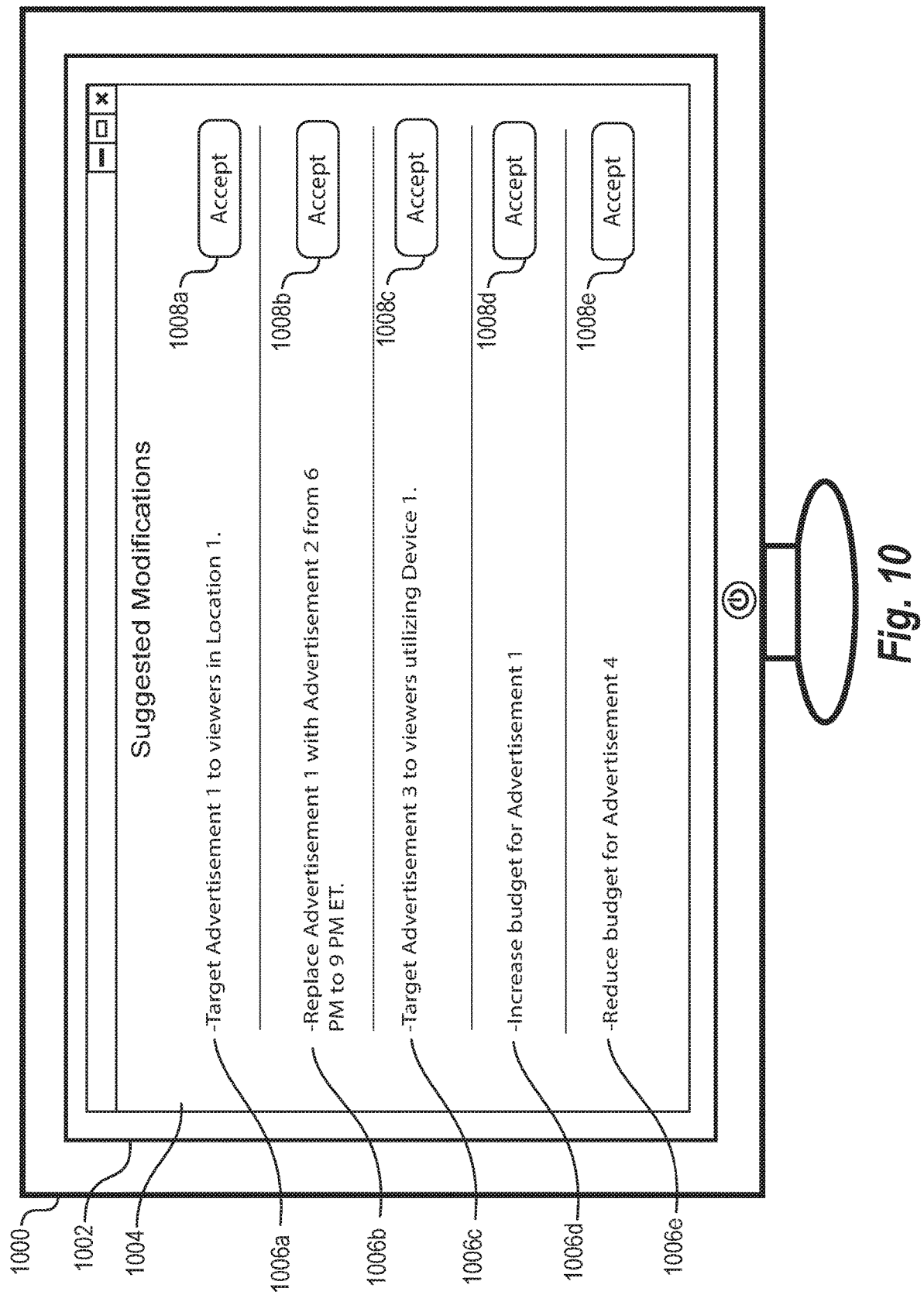
FIG. 10 illustrates a user interface for modifying an online ad campaign based on a placebo-based experiment in accordance with one or more embodiments.

For example, FIG. 10 illustrates a user interface for suggesting and implementing modifications to an online ad campaign based on a media lift experiment. In particular, FIG. 10 illustrates a computing device 1000 with a display screen 1002 illustrating a user interface 1004. The user interface 1004 includes a plurality of suggested modifications 1006d-1006e. In particular, the suggested modifications 1006d-1006e comprise modifications to campaign parameters of an online ad campaign based on the results of a media lift experiment corresponding to the online ad campaign.

As just mentioned, the real-time experimentation system 100 generates the suggested modifications 1006d-1006e based on the results of a media lift experiment. To illustrate, the real-time experimentation system 100 can analyze the results of one or more media lift experiments to determine modifications that will improve conversions for an online ad campaign. For example, as a result of one or more medial lift experiments, the real-time experimentation system 100 can determine that a first advertisement results in higher conversions in relation to viewers in a first geographic location. Based on that determination, the real-time experimentation system 100 can generate the suggested modification 1006a to target the first advertisement to viewers in the first location.

The real-time experimentation system 100 can suggest a variety of different modifications to improve an online ad campaign. For example, the real-time experimentation system 100 can suggest modifications to timing, targeting characteristics, or budgeting. For instance, in relation to the embodiment of FIG. 10, the real-time experimentation system 10 determines that a first advertisement results in additional conversions from 6:00 to 9:00 pm. As a result, the real-time experimentation system 100 generates the suggested modification 1006b of replacing a second advertisement with the first advertisement from 6:00 to 9:00 pm.

Similarly, the real-time experimentation system 100 determines that viewers utilizing a first device (e.g., Android devices) tend to purchase additional products when shown a third advertisement. Accordingly, the real-time experimentation system 100 generates the suggested modification 1006c of modifying targeting characteristics of an online ad campaign to target the third advertisement to viewers utilizing the first device. Moreover, the real-time experimentation system 100 determines that the first advertisement increased one or more measures of media lift while a fourth advertisement reduced one or more measures of media lift. In response, the real-time experimentation system 100 generates the suggested modifications 1006d, 1006e to increase the budget for the first advertisement and reduce the budget for the fourth advertisement.

As shown in FIG. 10, the real-time experimentation system 100 also includes selectable elements 1008a-1008e for implementing the suggested modifications 1006a-1006e within the user interface 1004. In particular, the real-time experimentation system 100 can detect user interaction with the selectable elements 1008a-1008e and implement one or more of the suggested modifications 1006a-1006e based on the user interaction. To illustrate, the real-time experimentation system 100 can modify one or more campaign parameters and run an online campaign with the modified set of campaign parameters. Specifically, the real-time experimentation system 100 can receive, from a remote server, a new bid request package for a new impression opportunity associated with a viewer. The real-time experimentation system 100 can analyze the bid request package in view of the modified set of campaign parameters and respond based on the modified set of campaign parameters. For example, the real-time experimentation system 100 determines that a viewer satisfies a modified set of targeting parameters and respond to the bid request package by providing a bid and providing an advertisement for display to the viewer.

As mentioned above, in one or more embodiments, the real-time experimentation system 100 automatically implements the suggested modifications 1006a-1006e. In particular, rather than providing the suggested modifications 1006a-1006e via the user interface 1004, the real-time experimentation system 100 can automatically implement the modifications and adjust the online ad campaign. Thus, the real-time experimentation system 100 can improve the performance of an online ad campaign based on the results of a media lift experiment in real time.

The real-time experimentation system 100 can conduct media lift experiments and modify online ad campaigns in real-time. In particular, the real-time experimentation system 100 can operate an online ad campaign while performing and receiving results of a media lift experiment. Moreover, the real-time experimentation system 100 can modify an online ad campaign (while it is running) based on the results of a media lift to improve performance of the online ad campaign while the online ad campaign is ongoing. The real-time experimentation system 100 can then continue running a media lift experiment as the modified online ad campaign is running. Accordingly, in one or more embodiments, the real-time experimentation system 100 can constantly monitor and improve online ad campaigns.

Figure 11:
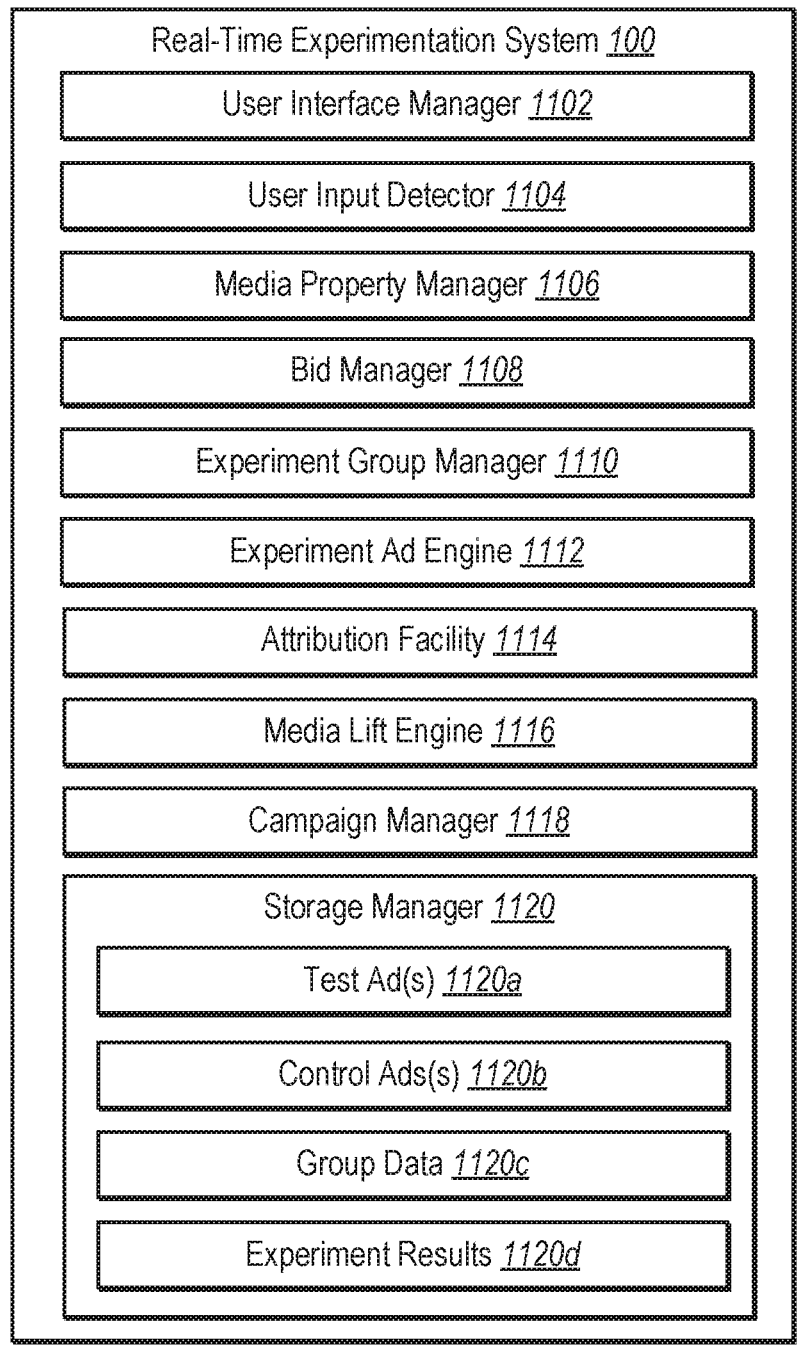
FIG. 11 illustrates a schematic diagram illustrating a real-time experimentation system in accordance with one or more embodiments.

Turning now to FIG. 11, additional detail is provided regarding components and capabilities of one or more embodiment of the real-time experimentation system 100. As shown, the real-time experimentation system 100 may include, but is not limited to a user interface manager 1102, a user input detector 1104, a media property manager 1106, a bid manager 1108, an experiment group manager 1110, an experiment ad engine 1112, an attribution facility 1114, a media lift engine 1116, a campaign manager 1118, and a storage manager 1120 (including test ad(s) 1120a, control ad(s) 1120b, group data 1120c, and experimental results 1120d).

As just mentioned, and as illustrated in FIG. 11, the real-time experimentation system 100 may include the user interface manager 1102. The user interface manager 1102 can provide, manage, and/or control a graphical user interface (or simply "user interface") for use with the real-time experimentation system 100. In particular, the user interface manager 1102 may facilitate presentation of information by way of an external component of one or more client devices. For example, the user interface manager 1102 may display a user interface by way of a display screen associated with one or more client devices. The user interface may be composed of a plurality of graphical components, objects, and/or elements that allow a user to perform a function. The user interface manager 1102 can present a variety of types of information, including text, images, video, audio, characters, or other information. Moreover, the user interface manager 1102 can provide a variety of user interfaces specific to any variety of functions, programs, applications, plug-ins, devices, operating systems, and/or components of computing devices (e.g., the user interfaces 706, 806, 1004).

In addition to the user interface manager 1102, as shown in FIG. 11, the real-time experimentation system 100 also includes the user input detector 1104. The user input detector 1104 can detect, identify, monitor, receive, process, capture, and/or record various types of user input. For example, the user input detector 1104 may be configured to detect one or more user interactions with respect to a user interface. As referred to herein, a "user interaction" refers to conduct performed by a user (or a lack of conduct performed by a user) to control the function of a computing device. "User input," as used herein, refers to input data generated in response to a user interaction.

The user input detector 1104 can operate in conjunction with any number of user input devices or computing devices (in isolation or in combination), including personal computers, laptops, smartphones, smart watches, tablets, touch-screen devices, televisions, personal digital assistants, mouse devices, keyboards, track pads, or stylus devices. The user input detector 1104 can detect and identify various types of user interactions with user input devices, such as select events, drag events, scroll events, and so forth. For example, in the event a computing device includes a touch screen, the user input detector 1104 can detect one or more touch gestures (e.g., swipe gestures, tap gestures, pinch gestures, or reverse pinch gestures) from a user that forms a user interaction.

As shown in FIG. 11, the real-time experimentation system 100 also includes the media property manager 1106. The media property manager 1106 can provide, generate, and/or interact with one or more media properties. For example, the media property manager 1106 can provide, generate, and/or interact with a website, an application, or a game accessible to one or more viewers. To illustrate, in one or more embodiments, the media property manager 1106 identifies and/or receives available impression opportunities (e.g., ad slots) from a website. In one or more embodiments, the media property manager 1106 collects thousands of available impression opportunities from different media properties as viewers visit the media properties.

As illustrated in FIG. 11, the real-time experimentation system 100 also includes the bid manager 1108. The bid manager 1108 can operate an online auction in relation to one or more media properties. For instance, the bid manager 1108 can generate, send, and/or receive bid request packages. Moreover, the bid manager 1108 can also generate, send, and/or receive bid responses. The bid manager 1108 can also analyze one or more bids. For example, the bid manager 1108 can analyze one or more bid responses and determine a winning bid (e.g., a highest bid). To illustrate, the bid manager 1108 can run an online auction by collecting and analyzing bids for each of the available impression opportunities identified by the media property manager 1106. The bid manager 1108 can do so within milliseconds of a viewer visiting a media property.

In addition to the bid manager 1108, as shown in FIG. 11, the real-time experimentation system 100 also includes the experiment group manager 1110. The experiment group manager 1110 can generate, identify, and/or determine a group corresponding to a viewer. For example, the experiment group manager 1110 can determine whether a viewer belongs to a test group or a control group in a media lift experiment. As mentioned above, the experiment group manager 1110 can assign a viewer to a group (e.g., for viewers that have not previously been assigned to a group) or determine a group that a viewer was previously assigned to. For example, the experiment group manager 1110 can analyze a viewer id of a viewer, determine that the viewer has not previously been assigned a group (e.g., has not previously seen a test ad or control ad), and assign the viewer to a group based on a randomizing function and control frequency threshold.

Further, as illustrated in FIG. 11, the real-time experimentation system 100 also includes the experiment ad engine 1112. The experiment ad engine 1112 can select, determine, and/or provide an advertisement. In particular, the experiment ad engine 1112 can select a test ad for viewers corresponding to a test group. Moreover, the experiment ad engine 1112 can select a control ad (i.e., a control ad from a second advertiser) for viewers corresponding to a control group. The experiment ad engine can provide the selected ad for display to a viewer (e.g., as part of a bid response via the bid manager 1108).

In addition to the experiment ad engine 1112, the real-time experimentation system 100 also includes the attribution facility 1114. The attribution facility 1114 can monitor, track, and/or detect user interactions (e.g., conversions). Moreover, the attribution facility 1114 can determine attribution to one or more advertisements for the one or more user interactions (e.g., attribution for the conversion). For example, the attribution facility 1114 can track user interactions via server-side tracking, tracking pixels (e.g., stats pixels or segment tracking pixels), or other methods. To illustrate, the attribution facility 1114 can determine that a viewer has clicked on an advertisement, visited a web site of an advertiser, or purchased a product. Moreover, the attribution facility 1114 can determine an advertisement responsible for the viewer's click, visit, or purchase.

As shown in FIG. 11, the real-time experimentation system 100 also includes the media lift engine 1116. The media lift engine 1116 can determine, calculate, and/or generate media lift for an advertisement. In particular, the media lift engine 1116 can analyze attribution data and/or user interactions with one or more advertisements (e.g., from the attribution facility 1114) and determine media lift corresponding to a test advertisement. For example, the media lift engine 1116 can determine an increase in conversions due to a test advertisement.

Furthermore, as show in FIG. 11, the real-time experimentation system 100 also includes the campaign manager 1118. The campaign manager 1118 can operate, run, execute, implement, and/or modify one or more online ad campaigns. For instance, the campaign manager 1118 can identify campaign parameters (e.g., targeting parameters) and execute an online ad campaign based on the campaign parameters. To illustrate, the campaign manager 1118 can determine that an impression opportunity (from the media property manager 1106) satisfies campaign parameters, select a bid amount for the impression opportunity, and send (via the bid manager 1108) a bid for the impression opportunity.

As described above, the campaign manager 1118 can also modify campaign parameters. In particular, the campaign manager 1118 can modify campaign parameters based on the results of a media lift experiment. For instance, the campaign manager 1118 can modify targeting parameters to improve conversions based on results from a media lift experiment.

As shown in FIG. 11, the real-time experimentation system 100 also includes the storage manager 1120. The storage manager 1120 maintains data for the real-time experimentation system 100. The storage manager 1120 can maintain data of any type, size, or kind, as necessary to perform the functions of the digital identification system. As illustrated in FIG. 11, the storage manager 1120 includes test ad(s) 1120*a* (e.g., one or more advertisements from a first advertiser), control ad(s) 1120*b* (e.g., one or more advertisements from alternative advertisers or other sources), group data 1120*c* (e.g., information regarding viewers of particular groups, including viewer ids, segment ids, experiment ids, and promoted ad ids), and experimental results 1120*d* (e.g., attribution data or measures of media lift indicating performance of the test ads and/or control ads).

Figure 12:
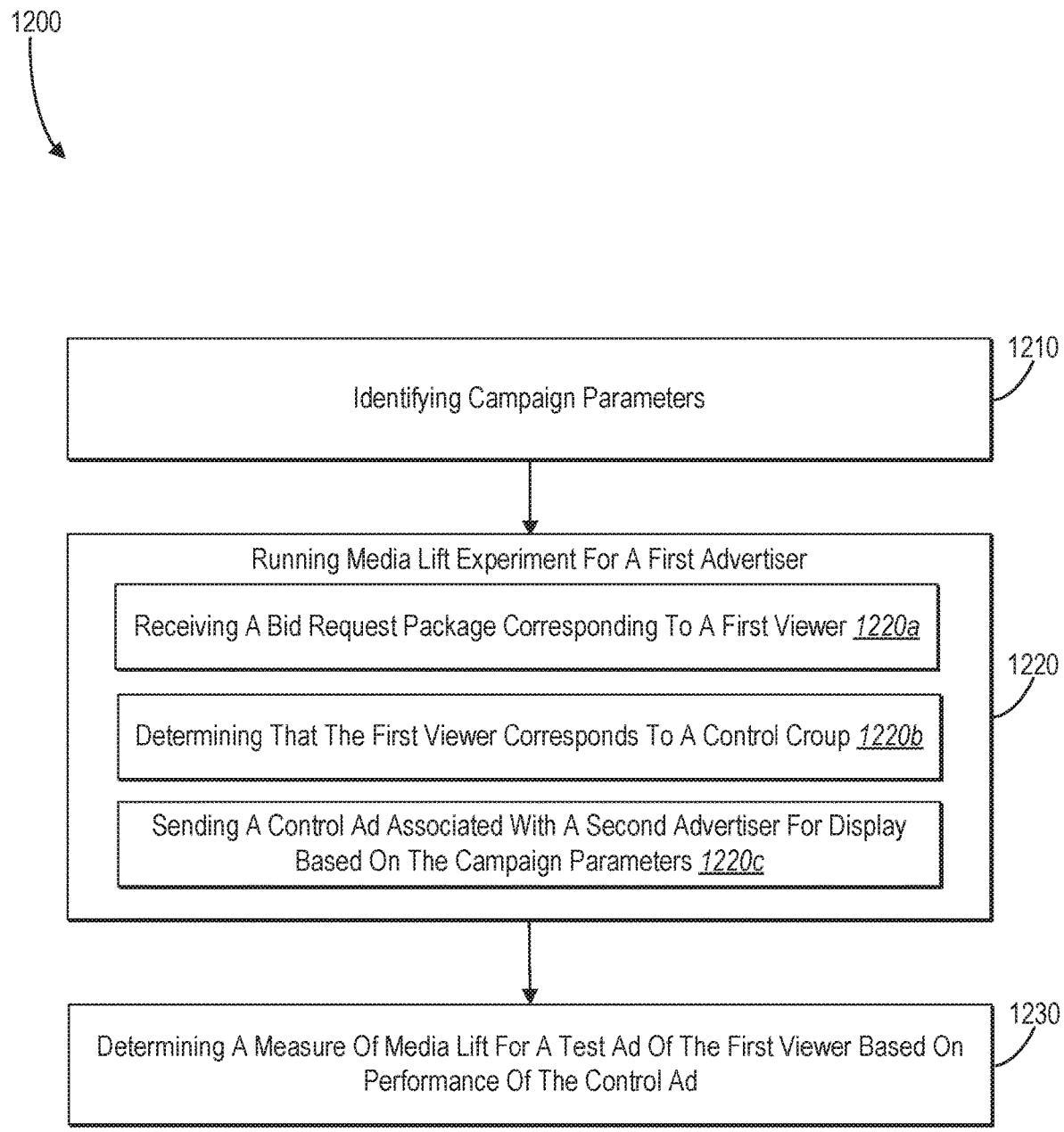
FIG. 12 illustrates a flowchart of a series of acts in a method of running a placebo-based experiment in accordance with one or more embodiments.

FIGS. 1-11, the corresponding text, and the examples, provide a number of different systems and devices for running and utilizing a media lift experiment. In addition to the foregoing, embodiments can also be described in terms of flowcharts comprising acts and steps in a method for accomplishing a particular result. For example, FIG. 12 illustrates a flowchart of exemplary methods in accordance with one or more embodiments of the present invention. The methods described in relation to FIG. 12 may be performed with less or more steps/acts or the steps/acts may be performed in differing orders. Additionally, the steps/acts described herein may be repeated or performed in parallel with one another or in parallel with different instances of the same or similar steps/acts.

In one or more embodiments, the method 1200 is performed in a digital medium environment that includes the real-time experimentation system 100. The method 1200 is intended to be illustrative of one or more methods in accordance with the present disclosure, and is not intended to limit potential embodiments. Alternative embodiments can include additional, fewer, or different steps than those articulated in FIG. 12.

As shown in FIG. 12, the method 1200 includes an act 1210 of identifying campaign parameters. In particular, the act 1210 can include identifying a first set of campaign parameters of a first advertiser and a second set of campaign parameters of a second advertiser. Further, the act 1210 can also include identifying a first set of targeting parameters of a first advertiser and a second set of targeting parameters of a second advertiser.

Moreover, as shown in FIG. 12, the method 1200 also includes an act 1220 of running a media lift experiment for a first advertiser. For example, in one or more embodiments, the act 1220 includes running a media lift experiment for a first advertiser by sending a control ad associated with a second advertiser for display to the first viewer As shown, the act 1220 can include the act 1220a of receiving a bid request package corresponding to a first viewer. In particular, the act 1220a can include receiving a bid request package for an impression opportunity associated with a first viewer. Moreover, the act 1220a can include receiving, from a remote server, a bid request package for an impression opportunity associated with a first viewer visiting a website.

Moreover, the act 1220 can also include the act 1220b of determining that the first viewer corresponds to a control group. In particular, the act 1220b can include determining, by at least one processor, that the first viewer corresponds to a control group. For example, in one or more embodiments, the act 1220b includes determining that the first user corresponds to the control group comprises assigning the first viewer to the control group by applying a randomizing operation and control frequency threshold value.

In addition, the act 1220 can also include the act 1220c of sending a control ad associated with a second advertiser for display based on the campaign parameters. In particular, the act 1220c can include based on the first set of campaign parameters, the second set of campaign parameters, and the determination that the first viewer corresponds to the control group, automatically responding, by the at least one processor, to the bid request package by sending a control ad associated with the second advertiser to the remote server for display to the first viewer via the web site. Moreover, in one or more embodiments, the act 1220c includes based on a determination that a first viewer satisfies the first set of targeting parameters and the second set of targeting parameters and based on a determination that the first viewer corresponds to a control group, automatically sending a control ad associated with the second advertiser for display to the first viewer For example, in one or more embodiments, the act 1220c comprises sending a bid for the control ad associated with the second advertiser to the remote server within 250 milliseconds of receiving the bid request package from the remote server. Furthermore, in one or more embodiments, the act 1220c also includes based on a determination the first viewer satisfies the first set of targeting parameters and the second set of targeting parameters and based on the determination that the first viewer corresponds to the control group, automatically responding, by the at least one processor, to the bid request package by sending a control ad associated with the second advertiser to the remote server for display to the first viewer via the website In one or more embodiments, the act 1220 also includes determining that the first viewer satisfies both the first set of campaign parameters of the first advertiser and the second set of campaign parameters of the second advertiser. Moreover, the act 1220 can also include automatically responding to the bid request package by sending the control ad associated with the second advertiser based on the determination that the first viewer satisfies both the first set of campaign parameters and the second set of campaign parameters.

In addition, as illustrated in FIG. 12, the method 1200 also includes an act 1230 of determining a measure of media lift for a test ad of the first viewer based on performance of the control ad. In particular, the act 1230 can include determining a measure of media lift for a test ad associated with the first advertiser based on performance of the control ad associated with the second advertiser. For example, in one or more embodiments, the act 1230 includes identifying a first user interaction by the first user with the control ad associated with the second advertiser; identifying a second user interaction by the second viewer with the test ad associated with the first advertiser; and comparing the first user interaction by the first viewer with the control ad associated with the second advertiser with the second user interaction by the second viewer with the test ad associated with the first advertiser. In addition, in one or more embodiments, the act 120 includes comparing performance of the control ad associated with the second advertiser to a test ad associated with the first advertiser.

Moreover, in one or more embodiments, the method 1200 also includes automatically modifying the first set of campaign parameters (e.g., the first set of targeting parameters) based on the measure of media lift. For example, in one or more embodiments, the method 1200 includes modifying one or more campaign parameters (e.g., one or more targeting parameters) of the first advertiser based on the comparison between the performance of the control ad associated with the second advertiser and the test ad associated with the first advertiser.

Moreover, the method 1200 can also include running an online ad campaign with the modified first set of campaign parameters by: receiving, from the remote server, a second bid request package for a second impression opportunity associated with a second user; and responding to the second bid request package based on the modified first set of campaign parameters. For example, the method 1200 can include modifying viewer targeting parameters or modifying a budget for one or more advertisements.

Furthermore, in one or more embodiments, the method 1200 also includes receiving, from the remote server, a second bid request package for a second impression opportunity associated with a second viewer; determining that the second viewer corresponds to a test group; and based on the first set of campaign parameters and the determination that the first viewer corresponds to the test group, automatically responding to the second bid request package by sending the test ad associated with the first advertiser to the remote server for display to the second viewer. In one or more embodiments, determining that the second user corresponds to the test group comprises assigning the second viewer to the test group by applying the randomizing operation and the control frequency threshold value.

Moreover, in one or more embodiments of the method 1200, determining that the first user corresponds to the control group comprises assigning the first viewer to the control group by applying a randomizing operation and control frequency threshold value; and determining that the second user corresponds to the test group comprises assigning the second viewer to the test group by applying the randomizing operation and the control frequency threshold value.

In one or more embodiments, the method 1200 also includes running a second media lift experiment for the second advertiser together with the first media lift experiment for the first advertiser. To illustrate, the method 1200 can include receiving a bid request package for an impression opportunity associated with a second viewer; determining that the second viewer corresponds to a control group of the second advertiser; based on a determination the second viewer satisfies the first set of targeting parameters and the second set of targeting parameters and based on the determination that the second viewer corresponds to the control group of the second advertiser, automatically send a control ad associated with the first advertiser for display to the second viewer; and determining a measure of media lift for a test ad associated the second advertiser based on performance of the control ad associated with the first advertiser Note that the quantity and complexity of the data and tasks involved in operating one or more embodiments make implementation difficult without the aid of one or more sequential machines—typically sequential processes operating on the one or more processors referred to above and also use of a hardware communications infrastructure (e.g., the Internet). During the analysis and actionable processes involved, millions of data elements must be considered and without using a machine, implementation of the claimed processes would not be possible. Typically, a demand-side platform must both analyze and respond to an ad slot opportunity in less than 250 milliseconds. This response time limit is generally understood throughout the online advertising community, and while the time limit may vary from one supply-side platform to another, is generally less than 250 ms. To date, applicant has seen bid response time limits typically between 70 and 100 ms with some ranging up to 150 ms. Note that this rapid succession of events comprising applicant's processes as claimed is necessary such that when a viewer goes to a webpage, the locations for advertisements on that page will not be initially shown as blank boxes.

Performing the claimed processes to provide this response time with "pencil and paper" is impossible for many reasons. In fact, the disclosed systems and methods require an intimate usage of computer networks (e.g., for the demand-side platform to communicate via the communications network with supply-side platforms; advertising exchanges; advertising networks; and attribution partners). For example, a demand-side platform receives bid request packages, determines if and how much to bid, and supplies the ads themselves in less than 250 milliseconds via the Internet. If the demand-side platform fails to perform these processes within the time limit specified by the supply-side platform, the submitted bid will generally be ignored. Moreover, after a campaign has run, a demand-side platform automatically receives attribution data from attribution partners, and uses the attribution data to automatically determine media lift. The preceding description names only some of the automated processes and actions involved in implementing one or more embodiments as claimed.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
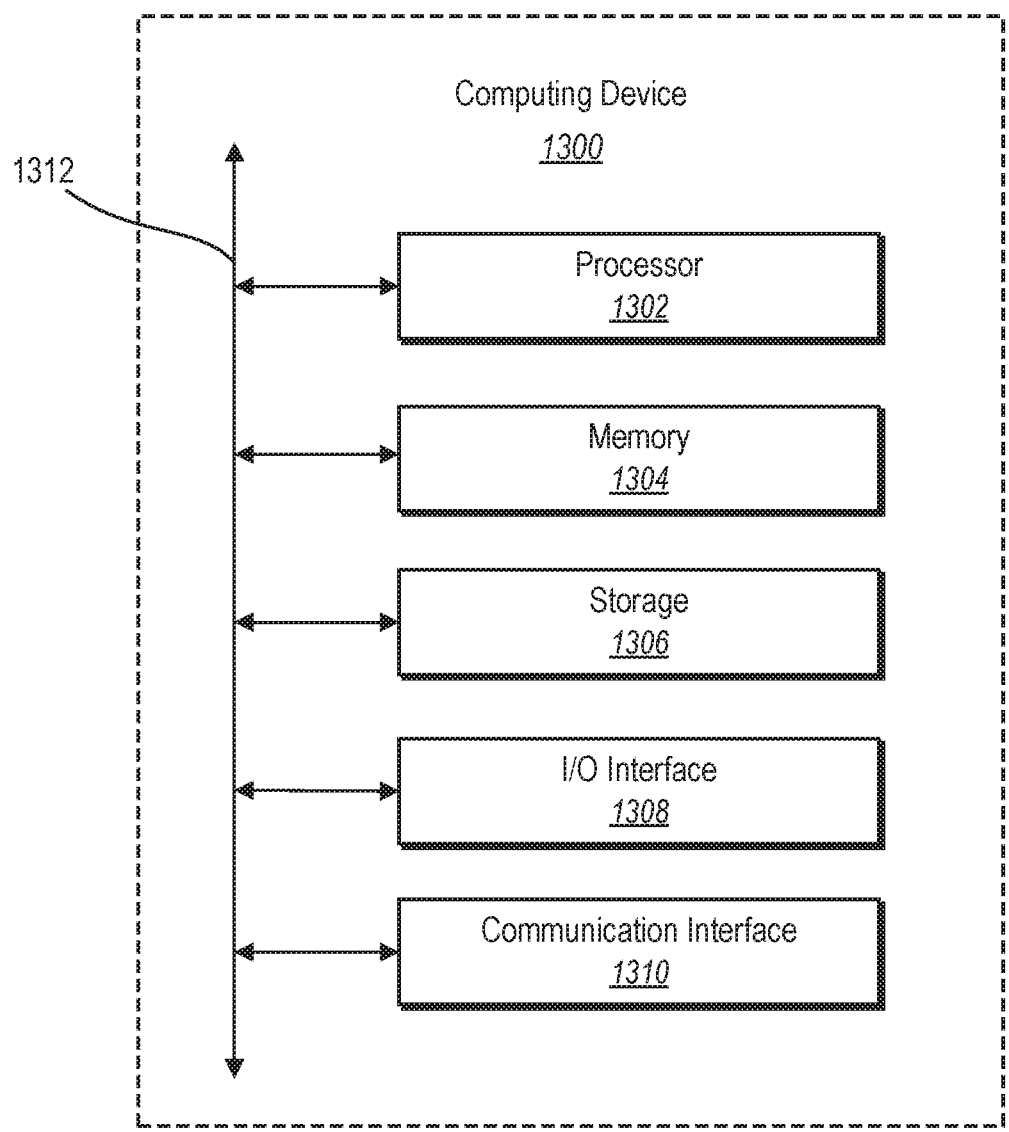
FIG. 13 illustrates a block diagram of an exemplary computing device in accordance with one or more embodiments.

FIG. 13 illustrates, in block diagram form, an exemplary computing device 1300 that may be configured to perform one or more of the processes described above. One will appreciate that the real-time experimentation system 100 can comprise implementations of the computing device 1300. As shown by FIG. 13, the computing device can comprise a processor 1302, memory 1304, a storage device 1306, an I/O interface 1308, and a communication interface 1310. In certain embodiments, the computing device 1300 can include fewer or more components than those shown in FIG. 13. Components of computing device 1300 shown in FIG. 13 will now be described in additional detail.

In particular embodiments, processor(s) 1302 includes hardware for executing instructions, such as those making up a computer program. As an example and not by way of limitation, to execute instructions, processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example and not by way of limitation, storage device 1306 can comprise a non-transitory storage medium described above. The storage device 1306 may include a hard disk drive (HDD), flash memory, a Universal Serial Bus (USB) drive or a combination of these or other storage devices.

The computing device 1300 also includes one or more input or output ("I/O") devices/interfaces 1308, which are provided to allow a user to provide input to (such as user strokes), receive output from, and otherwise transfer data to and from the computing device 1300. These I/O devices/interfaces 1308 may include a mouse, keypad or a keyboard, a touch screen, camera, optical scanner, network interface, modem, other known I/O devices or a combination of such I/O devices/interfaces 1308. The touch screen may be activated with a stylus or a finger.

The I/O devices/interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1308 is configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 can provide one or more interfaces for communication (such as, for example, packet-based communication) between the computing device and one or more other computing devices 1300 or one or more networks. As an example and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can comprise hardware, software, or both that couples components of computing device 1300 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. In a digital medium environment for real-time bidding on impression opportunities associated with viewers simultaneously accessing digital content, a computer-implemented method of conducting a placebo-based experiment for improving online campaigns, comprising:

identifying a first set of campaign parameters of a first advertiser and a second set of campaign parameters of a second advertiser;

running a media lift experiment for the first advertiser by:
receiving, from a remote server, a bid request package for an impression opportunity associated with a first viewer visiting a website;

determining, by at least one processor, that the first viewer corresponds to a control group; and based on the first set of campaign parameters, the second set of campaign parameters, and the determination that the first viewer corresponds to the control group, automatically responding, by the at least one processor, to the bid request package by sending a control ad associated with the second advertiser to the remote server for display to a client device of the first viewer via the website;

placing instructions in the control ad associated with the second advertiser that cause a first tracking cookie corresponding to the first advertiser to be transmitted to the client device of the first viewer when the control ad is presented on the client device, wherein the first tracking cookie references a test ad associated with the first advertiser;

determining one or more conversion events corresponding to the control ad associated with the second advertiser based on the first tracking cookie corresponding to the first advertiser; and determining a measure of media lift for the test ad associated with the first advertiser based at least in part on subtracting the one or more conversion events corresponding to the control ad associated with the second advertiser and the first tracking cookie from test conversion events corresponding to the test ad associated with the first advertiser.

2. The method of claim 1, wherein automatically responding to the bid request package comprises sending a bid for the control ad associated with the second advertiser to the remote server within 250 milliseconds of receiving the bid request package from the remote server.

3. The method of claim 1, further comprising providing the measure of media lift for display via a user interface of a client device, wherein the user interface comprises a selectable element for modifying the control ad.

4. The method of claim 3, wherein the user interface further comprises selectable elements for modifying the first set of campaign parameters.

5. The method of claim 1, wherein running the media lift experiment for the first advertiser further comprises:
determining that the first viewer satisfies both the first set of campaign parameters of the first advertiser and the second set of campaign parameters of the second advertiser; and
automatically responding to the bid request package by sending the control ad associated with the second advertiser based on the determination that the first viewer satisfies both the first set of campaign parameters and the second set of campaign parameters.

6. The method of claim 1, further comprising:
receiving, from the remote server, a second bid request package for a second impression opportunity associated with a second viewer;
determining that the second viewer corresponds to a test group; and
based on the first set of campaign parameters and the determination that the first viewer corresponds to the test group, automatically responding to the second bid request package by sending the test ad associated with the first advertiser to the remote server for display to the second viewer.

7. The method of claim 6, wherein determining the measure of media lift comprises:
identifying a first user interaction by the first viewer with the control ad associated with the second advertiser;
identifying a second user interaction by the second viewer with the test ad associated with the first advertiser; and
comparing the first user interaction by the first viewer with the control ad associated with the second advertiser with the second user interaction by the second viewer with the test ad associated with the first advertiser.

8. The method of claim 7, wherein:
determining that the first viewer corresponds to the control group comprises assigning the first viewer to the control group by applying a randomizing operation and control frequency threshold value; and
determining that the second viewer corresponds to the test group comprises assigning the second viewer to the test group by applying the randomizing operation and the control frequency threshold value.

9. A system comprising:
at least one server; and
at least one non-transitory computer readable storage medium storing instructions that, when executed by the at least one server, cause the system to:
identify a first set of targeting parameters of a first advertiser and a second set of targeting parameters of a second advertiser;
based on a determination that a first viewer satisfies the first set of targeting parameters and the second set of targeting parameters and based on a determination that the first viewer corresponds to a control group, automatically sending a control ad associated with the second advertiser for display to a client device of the first viewer;
placing instructions in the control ad associated with the second advertiser that cause a first tracking cookie corresponding to the first advertiser to be transmitted to the client device of the first viewer when the control ad is presented on the client device, wherein the first tracking cookie references a test ad associated with the first advertiser;
determining one or more conversion events corresponding to the control ad associated with the second advertiser based on the first tracking cookie corresponding to the first advertiser; and
determining a measure of media lift for the test ad associated with the first advertiser based at least in part on subtracting the one or more conversion events corresponding to the control ad associated with the second advertiser and the first tracking cookie from test conversion events corresponding to the test ad associated with the first advertiser.

10. The system of claim 9, wherein automatically sending the control ad comprises automatically sending a bid for the control ad associated with the second advertiser within 250 milliseconds of receiving a bid request package.

11. The system of claim 9, further comprising instructions that, when executed by the at least one server, cause the system to: provide the measure of media lift for display via a user interface of a client device, wherein the user interface comprises a selectable element for modifying the control ad.

12. The system of claim 9, further comprising instructions that, when executed by the at least one server, cause the system to:
receive a bid request package for an impression opportunity associated with a second viewer;
determine that the second viewer corresponds to a test group; and
based on the first set of targeting parameters and the determination that the first viewer corresponds to the test group, automatically responding to the bid request package by sending the test ad associated with the first advertiser for display to the second viewer.

13. The system of claim 12, further comprising instructions that, when executed by the at least one server, cause the system to determine the measure of media lift by:
   identifying a first user interaction by the first viewer with the control ad associated with the second advertiser;
   identifying a second user interaction by the second viewer with the test ad associated with the first advertiser; and
   comparing the first user interaction by the first viewer with the control ad associated with the second advertiser with the second user interaction by the second viewer with the test ad associated with the first advertiser.

14. A non-transitory computer readable medium storing instructions thereon that, when executed by at least one processor, cause a computing device to:
   identify a first set of campaign parameters of a first advertiser and a second set of campaign parameters of a second advertiser;
   run a media lift experiment for the first advertiser by:
      receiving, from a remote server, a bid request package for an impression opportunity associated with a first viewer visiting a website;
      determining, by the at least one processor, that the first viewer corresponds to a control group; and
      based on the first set of campaign parameters, the second set of campaign parameters, and the determination that the first viewer corresponds to the control group, automatically responding, by the at least one processor, to the bid request package by sending a control ad associated with the second advertiser to the remote server for display to a client device of the first viewer via the website;
   placing instructions in the control ad associated with the second advertiser that cause a first tracking cookie corresponding to the first advertiser to be transmitted to the client device of the first viewer when the control ad is presented on the client device, wherein the first tracking cookie references a test ad associated with the first advertiser;
   determining one or more conversion events corresponding to the control ad associated with the second advertiser based on the first tracking cookie corresponding to the first advertiser; and
   determining a measure of media lift for the test ad associated with the first advertiser based at least in part on subtracting the one or more conversion events corresponding to the control ad associated with the second advertiser and the first tracking cookie from test conversion events corresponding to the test ad associated with the first advertiser.

15. The non-transitory computer readable medium of claim 14, wherein automatically responding to the bid request package comprises sending a bid for the control ad associated with the second advertiser to the remote server within 250 milliseconds of receiving the bid request package from the remote server.

16. The non-transitory computer readable medium of claim 14, wherein running the media lift experiment for the first advertiser further comprises:
   determining that the first viewer satisfies both the first set of campaign parameters of the first advertiser and the second set of campaign parameters of the second advertiser; and
   automatically responding to the bid request package by sending the control ad associated with the second advertiser based on the determination that the first viewer satisfies both the first set of campaign parameters and the second set of campaign parameters.

17. The non-transitory computer readable medium of claim 14, further comprising instructions stored thereon that, when executed by the at least one processor, cause the computing device to:
   receive, from the remote server, a second bid request package for a second impression opportunity associated with a second viewer;
   determine that the second viewer corresponds to a test group; and
   based on the first set of campaign parameters and the determination that the first viewer corresponds to the test group, automatically respond to the second bid request package by sending the test ad associated with the first advertiser to the remote server for display to the second viewer.

18. The non-transitory computer readable medium of claim 17, wherein determining the measure of media lift comprises:
   identifying a first user interaction by the first viewer with the control ad associated with the second advertiser;
   identifying a second user interaction by the second viewer with the test ad associated with the first advertiser; and
   comparing the first user interaction by the first viewer with the control ad associated with the second advertiser with the second user interaction by the second viewer with the test ad associated with the first advertiser.

19. The non-transitory computer readable medium of claim 18, wherein:
   determining that the first viewer corresponds to the control group comprises assigning the first viewer to the control group by applying a randomizing operation and control frequency threshold value; and
   determining that the second viewer corresponds to the test group comprises assigning the second viewer to the test group by applying the randomizing operation and the control frequency threshold value.

20. The non-transitory computer readable medium of claim 14, further comprising instructions stored thereon that, when executed by the at least one processor, cause the computing device to provide the measure of media lift for display via a user interface of a client device, wherein the user interface comprises a selectable element for modifying the control ad.

* * * * *